(12) United States Patent
Uzun

(10) Patent No.: US 9,407,432 B2
(45) Date of Patent: Aug. 2, 2016

(54) SYSTEM AND METHOD FOR EFFICIENT AND SECURE DISTRIBUTION OF DIGITAL CONTENT

(71) Applicant: Palo Alto Research Center Incorporated, Palo Alto, CA (US)

(72) Inventor: Ersin Uzun, Campbell, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 0 days.

(21) Appl. No.: 14/219,962

(22) Filed: Mar. 19, 2014

(65) Prior Publication Data

US 2015/0270957 A1    Sep. 24, 2015

(51) Int. Cl.
| H04L 29/06 | (2006.01) |
|---|---|
| H04L 9/08 | (2006.01) |
| H04L 9/14 | (2006.01) |

(52) U.S. Cl.
CPC ............ *H04L 9/0822* (2013.01); *H04L 9/0825* (2013.01); *H04L 9/14* (2013.01); *H04L 2209/603* (2013.01)

(58) Field of Classification Search
CPC ....... H04L 60/08; H04L 60/0428; H04L 9/08; H04L 9/32; H04L 9/327; H04L 9/0822; H04L 9/14; H04L 2209/24
USPC ......................................................... 713/168
See application file for complete search history.

(56) References Cited

U.S. PATENT DOCUMENTS

| 817,441 A | 4/1906 | Niesz |
|---|---|---|
| 4,309,569 A | 1/1982 | Merkle |

(Continued)

FOREIGN PATENT DOCUMENTS

| DE | 1720277 A1 | 6/1967 |
|---|---|---|
| DE | 19620817 A1 | 11/1997 |

(Continued)

OTHER PUBLICATIONS

G. Ateniese, K. Fu, M. Green, and S. Hohenberger. Improved Proxy Reencryption Schemes with Applications to Secure Distributed Storage. In the 12th Annual Network and Distributed System Security Symposium (2005).

(Continued)

*Primary Examiner* — John B King
(74) *Attorney, Agent, or Firm* — Shun Yao; Park, Vaughan, Fleming & Dowler LLP

(57) ABSTRACT

One embodiment provides a system for processing encrypted content. During operation, a client computing device determines a request for content based on the identity of the user or the client computing device. Content is received which has been encrypted using a master encryption, where the master encryption key is not known to the client computing device. The client computing device generates an interest packet that includes a request for a user-specific re-encryption key, and, based on the information in the interest packet, receives a content object that includes the user-specific re-encryption key. The client computing device decrypts the master-encrypted content by: re-encrypting the master-encrypted content, using the user-specific re-encryption key to transform the master-encrypted content to a user-specific encrypted content; and decrypting the transformed user-specific encrypted content using a user-specific key. This thereby facilitates the secure distribution of user-specific content without requiring a content source to distribute user-specific encrypted content.

24 Claims, 12 Drawing Sheets

(56) References Cited

U.S. PATENT DOCUMENTS

| | | |
|---|---|---|
| 4,921,898 A | 5/1990 | Lenney |
| 5,070,134 A | 12/1991 | Oyamada |
| 5,110,856 A | 5/1992 | Oyamada |
| 5,506,844 A | 4/1996 | Rao |
| 5,629,370 A | 5/1997 | Freidzon |
| 5,870,605 A | 2/1999 | Bracho |
| 6,052,683 A | 4/2000 | Irwin |
| 6,091,724 A | 7/2000 | Chandra |
| 6,173,364 B1 | 1/2001 | Zenchelsky |
| 6,226,618 B1* | 5/2001 | Downs et al. .................. 705/51 |
| 6,233,646 B1 | 5/2001 | Hahm |
| 6,332,158 B1 | 12/2001 | Risley |
| 6,366,988 B1 | 4/2002 | Skiba |
| 6,574,377 B1 | 6/2003 | Cahill |
| 6,654,792 B1 | 11/2003 | Verma |
| 6,667,957 B1 | 12/2003 | Corson |
| 6,681,220 B1 | 1/2004 | Kaplan |
| 6,681,326 B2* | 1/2004 | Son et al. ...................... 713/150 |
| 6,769,066 B1 | 7/2004 | Botros |
| 6,772,333 B1 | 8/2004 | Brendel |
| 6,862,280 B1 | 3/2005 | Bertagna |
| 6,901,452 B1 | 5/2005 | Bertagna |
| 6,917,985 B2 | 7/2005 | Madruga |
| 6,968,393 B1 | 11/2005 | Chen |
| 6,981,029 B1 | 12/2005 | Menditto |
| 7,013,389 B1 | 3/2006 | Srivastava |
| 7,031,308 B2 | 4/2006 | Garcia-Luna-Aceves |
| 7,061,877 B1 | 6/2006 | Gummalla |
| 7,206,860 B2 | 4/2007 | Murakami |
| 7,257,837 B2 | 8/2007 | Xu |
| 7,287,275 B2 | 10/2007 | Moskowitz |
| 7,315,541 B1 | 1/2008 | Housel |
| 7,339,929 B2 | 3/2008 | Zelig |
| 7,350,229 B1 | 3/2008 | Lander |
| 7,382,787 B1 | 6/2008 | Barnes |
| 7,444,251 B2 | 10/2008 | Nikovski |
| 7,466,703 B1 | 12/2008 | Arunachalam |
| 7,472,422 B1 | 12/2008 | Agbabian |
| 7,496,668 B2 | 2/2009 | Hawkinson |
| 7,509,425 B1 | 3/2009 | Rosenberg |
| 7,523,016 B1 | 4/2009 | Surdulescu |
| 7,543,064 B2 | 6/2009 | Juncker |
| 7,552,233 B2 | 6/2009 | Raju |
| 7,555,482 B2 | 6/2009 | Korkus |
| 7,555,563 B2 | 6/2009 | Ott |
| 7,567,547 B2 | 7/2009 | Mosko |
| 7,567,946 B2 | 7/2009 | Andreoli |
| 7,580,971 B1 | 8/2009 | Gollapudi |
| 7,623,535 B2 | 11/2009 | Guichard |
| 7,647,507 B1 | 1/2010 | Feng |
| 7,660,324 B2 | 2/2010 | Oguchi |
| 7,685,290 B2 | 3/2010 | Satapati |
| 7,698,463 B2 | 4/2010 | Ogier |
| 7,769,887 B1 | 8/2010 | Bhattacharyya |
| 7,779,467 B2 | 8/2010 | Choi |
| 7,801,177 B2 | 9/2010 | Luss |
| 7,816,441 B2 | 10/2010 | Elizalde |
| 7,831,733 B2 | 11/2010 | Sultan |
| 7,908,337 B2 | 3/2011 | Garcia-Luna-Aceves |
| 7,924,837 B1 | 4/2011 | Shabtay |
| 7,953,885 B1 | 5/2011 | Devireddy |
| 8,000,267 B2 | 8/2011 | Solis |
| 8,010,691 B2 | 8/2011 | Kollmansberger |
| 8,074,289 B1 | 12/2011 | Carpentier |
| 8,117,441 B2 | 2/2012 | Kurien |
| 8,160,069 B2 | 4/2012 | Jacobson |
| 8,204,060 B2 | 6/2012 | Jacobson |
| 8,214,364 B2 | 7/2012 | Bigus |
| 8,224,985 B2 | 7/2012 | Takeda |
| 8,225,057 B1 | 7/2012 | Zheng |
| 8,271,578 B2 | 9/2012 | Sheffi |
| 8,312,064 B1 | 11/2012 | Gauvin |
| 8,386,622 B2 | 2/2013 | Jacobson |
| 8,467,297 B2 | 6/2013 | Liu |
| 8,553,562 B2 | 10/2013 | Allan |
| 8,572,214 B2 | 10/2013 | Garcia-Luna-Aceves |
| 8,654,649 B2 | 2/2014 | Vasseur |
| 8,665,757 B2 | 3/2014 | Kling |
| 8,667,172 B2 | 3/2014 | Ravindran |
| 8,688,619 B1 | 4/2014 | Ezick |
| 8,699,350 B1 | 4/2014 | Kumar |
| 8,750,820 B2 | 6/2014 | Allan |
| 8,761,022 B2 | 6/2014 | Chiabaut |
| 8,762,477 B2 | 6/2014 | Xie |
| 8,762,570 B2 | 6/2014 | Qian |
| 8,762,707 B2 | 6/2014 | Killian |
| 8,767,627 B2 | 7/2014 | Ezure |
| 8,817,594 B2 | 8/2014 | Gero |
| 8,826,381 B2 | 9/2014 | Kim |
| 8,832,302 B1 | 9/2014 | Bradford |
| 8,836,536 B2 | 9/2014 | Marwah |
| 8,862,774 B2 | 10/2014 | Vasseur |
| 8,903,756 B2 | 12/2014 | Zhao |
| 8,923,293 B2* | 12/2014 | Jacobson ............... H04L 45/745 370/392 |
| 8,937,865 B1 | 1/2015 | Kumar |
| 9,071,498 B2 | 6/2015 | Beser |
| 9,112,895 B1 | 8/2015 | Lin |
| 2002/0010795 A1 | 1/2002 | Brown |
| 2002/0048269 A1 | 4/2002 | Hong |
| 2002/0054593 A1 | 5/2002 | Morohashi |
| 2002/0077988 A1* | 6/2002 | Sasaki et al. .................... 705/59 |
| 2002/0078066 A1 | 6/2002 | Robinson |
| 2002/0138551 A1 | 9/2002 | Erickson |
| 2002/0176404 A1 | 11/2002 | Girard |
| 2002/0188605 A1 | 12/2002 | Adya |
| 2002/0199014 A1 | 12/2002 | Yang |
| 2003/0046437 A1 | 3/2003 | Eytchison |
| 2003/0048793 A1 | 3/2003 | Pochon |
| 2003/0051100 A1 | 3/2003 | Patel |
| 2003/0074472 A1 | 4/2003 | Lucco |
| 2003/0097447 A1 | 5/2003 | Johnston |
| 2003/0140257 A1* | 7/2003 | Peterka et al. ................. 713/201 |
| 2004/0024879 A1 | 2/2004 | Dingman |
| 2004/0030602 A1 | 2/2004 | Rosenquist |
| 2004/0073715 A1 | 4/2004 | Folkes |
| 2004/0139230 A1 | 7/2004 | Kim |
| 2004/0221047 A1 | 11/2004 | Grover |
| 2004/0225627 A1 | 11/2004 | Botros |
| 2004/0252683 A1 | 12/2004 | Kennedy |
| 2005/0003832 A1 | 1/2005 | Osafune |
| 2005/0028156 A1 | 2/2005 | Hammond |
| 2005/0043060 A1 | 2/2005 | Brandenberg |
| 2005/0050211 A1 | 3/2005 | Kaul |
| 2005/0074001 A1 | 4/2005 | Mattes |
| 2005/0149508 A1 | 7/2005 | Deshpande |
| 2005/0159823 A1 | 7/2005 | Hayes |
| 2005/0198351 A1 | 9/2005 | Nog |
| 2005/0249196 A1 | 11/2005 | Ansari |
| 2005/0259637 A1 | 11/2005 | Chu |
| 2005/0262217 A1 | 11/2005 | Nonaka |
| 2005/0289222 A1 | 12/2005 | Sahim |
| 2006/0010249 A1 | 1/2006 | Sabesan |
| 2006/0029102 A1 | 2/2006 | Abe |
| 2006/0039379 A1 | 2/2006 | Abe |
| 2006/0051055 A1 | 3/2006 | Ohkawa |
| 2006/0072523 A1 | 4/2006 | Richardson |
| 2006/0099973 A1 | 5/2006 | Nair |
| 2006/0129514 A1 | 6/2006 | Watanabe |
| 2006/0133343 A1 | 6/2006 | Huang |
| 2006/0173831 A1 | 8/2006 | Basso |
| 2006/0193295 A1 | 8/2006 | White |
| 2006/0206445 A1 | 9/2006 | Andreoli |
| 2006/0215684 A1 | 9/2006 | Capone |
| 2006/0223504 A1 | 10/2006 | Ishak |
| 2006/0256767 A1 | 11/2006 | Suzuki |
| 2006/0268792 A1 | 11/2006 | Belcea |
| 2007/0019619 A1 | 1/2007 | Foster |
| 2007/0073888 A1 | 3/2007 | Madhok |
| 2007/0094265 A1 | 4/2007 | Korkus |
| 2007/0112880 A1 | 5/2007 | Yang |
| 2007/0124412 A1 | 5/2007 | Narayanaswami |
| 2007/0127457 A1 | 6/2007 | Mirtorabi |
| 2007/0160062 A1 | 7/2007 | Morishita |

(56) References Cited

U.S. PATENT DOCUMENTS

| | | |
|---|---|---|
| 2007/0162394 A1 | 7/2007 | Zager |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |
| 2007/0239892 A1 | 10/2007 | Ott |
| 2007/0240207 A1 | 10/2007 | Belakhdar |
| 2007/0245034 A1 | 10/2007 | Retana |
| 2007/0253418 A1 | 11/2007 | Shiri |
| 2007/0255699 A1 | 11/2007 | Sreenivas |
| 2007/0255781 A1 | 11/2007 | Li |
| 2007/0274504 A1 | 11/2007 | Maes |
| 2007/0276907 A1 | 11/2007 | Maes |
| 2007/0294187 A1 | 12/2007 | Scherrer |
| 2008/0005056 A1 | 1/2008 | Stelzig |
| 2008/0010366 A1 | 1/2008 | Duggan |
| 2008/0037420 A1 | 2/2008 | Tang |
| 2008/0043989 A1 | 2/2008 | Furutono |
| 2008/0046340 A1 | 2/2008 | Brown |
| 2008/0059631 A1 | 3/2008 | Bergstrom |
| 2008/0059787 A1* | 3/2008 | Hohenberger ........ H04L 9/3013 713/153 |
| 2008/0080440 A1 | 4/2008 | Yarvis |
| 2008/0101357 A1 | 5/2008 | Iovanna |
| 2008/0107034 A1 | 5/2008 | Jetcheva |
| 2008/0123862 A1 | 5/2008 | Rowley |
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0216086 A1 | 9/2008 | Tanaka |
| 2008/0243992 A1 | 10/2008 | Jardetzky |
| 2008/0256359 A1 | 10/2008 | Kahn |
| 2008/0270618 A1 | 10/2008 | Rosenberg |
| 2008/0271143 A1 | 10/2008 | Stephens |
| 2008/0287142 A1 | 11/2008 | Keighran |
| 2008/0288580 A1 | 11/2008 | Wang |
| 2008/0320148 A1 | 12/2008 | Capuozzo |
| 2009/0006659 A1 | 1/2009 | Collins |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |
| 2009/0067429 A1 | 3/2009 | Nagai |
| 2009/0077184 A1 | 3/2009 | Brewer |
| 2009/0092043 A1 | 4/2009 | Lapuh |
| 2009/0097631 A1 | 4/2009 | Gisby |
| 2009/0103515 A1 | 4/2009 | Pointer |
| 2009/0113068 A1 | 4/2009 | Fujihira |
| 2009/0144300 A1 | 6/2009 | Chatley |
| 2009/0157887 A1 | 6/2009 | Froment |
| 2009/0185745 A1 | 7/2009 | Momosaki |
| 2009/0193101 A1 | 7/2009 | Munetsugu |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |
| 2009/0285209 A1 | 11/2009 | Stewart |
| 2009/0287835 A1 | 11/2009 | Jacobson |
| 2009/0288163 A1 | 11/2009 | Jacobson |
| 2009/0292743 A1 | 11/2009 | Bigus |
| 2009/0293121 A1 | 11/2009 | Bigus |
| 2009/0300079 A1 | 12/2009 | Shitomi |
| 2009/0300407 A1 | 12/2009 | Kamath |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1 | 2/2010 | Beverly |
| 2010/0046546 A1 | 2/2010 | Ram |
| 2010/0057929 A1 | 3/2010 | Merat |
| 2010/0088370 A1 | 4/2010 | Wu |
| 2010/0094767 A1 | 4/2010 | Miltonberger |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1 | 8/2010 | Jacobson |
| 2010/0195654 A1 | 8/2010 | Jacobson |
| 2010/0195655 A1 | 8/2010 | Jacobson |
| 2010/0217874 A1 | 8/2010 | Anantharaman |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0268782 A1 | 10/2010 | Zombek |
| 2010/0272107 A1 | 10/2010 | Papp |
| 2010/0284309 A1 | 11/2010 | Allan |
| 2010/0284404 A1 | 11/2010 | Gopinath |
| 2010/0293293 A1 | 11/2010 | Beser |
| 2010/0322249 A1 | 12/2010 | Thathapudi |
| 2011/0013637 A1 | 1/2011 | Xue |
| 2011/0022812 A1 | 1/2011 | vanderLinden |
| 2011/0055392 A1 | 3/2011 | Shen |
| 2011/0055921 A1 | 3/2011 | Narayanaswamy |
| 2011/0090908 A1 | 4/2011 | Jacobson |
| 2011/0106755 A1 | 5/2011 | Hao |
| 2011/0145597 A1 | 6/2011 | Yamaguchi |
| 2011/0145858 A1 | 6/2011 | Philpott |
| 2011/0153840 A1 | 6/2011 | Narayana |
| 2011/0161408 A1 | 6/2011 | Kim |
| 2011/0202609 A1 | 8/2011 | Chaturvedi |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0265174 A1 | 10/2011 | Thornton |
| 2011/0271007 A1 | 11/2011 | Wang |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |
| 2012/0011551 A1 | 1/2012 | Levy |
| 2012/0036180 A1 | 2/2012 | Thornton |
| 2012/0047361 A1 | 2/2012 | Erdmann |
| 2012/0066727 A1 | 3/2012 | Nozoe |
| 2012/0106339 A1 | 5/2012 | Mishra |
| 2012/0114313 A1 | 5/2012 | Phillips |
| 2012/0120803 A1 | 5/2012 | Farkas |
| 2012/0136676 A1 | 5/2012 | Goodall |
| 2012/0136936 A1 | 5/2012 | Quintuna |
| 2012/0136945 A1 | 5/2012 | Lee |
| 2012/0137367 A1 | 5/2012 | Dupont |
| 2012/0141093 A1 | 6/2012 | Yamaguchi |
| 2012/0155464 A1 | 6/2012 | Kim |
| 2012/0158973 A1 | 6/2012 | Jacobson |
| 2012/0163373 A1 | 6/2012 | Lo |
| 2012/0179653 A1 | 7/2012 | Araki |
| 2012/0197690 A1 | 8/2012 | Agulnek |
| 2012/0198048 A1 | 8/2012 | Ioffe |
| 2012/0221150 A1 | 8/2012 | Arensmeier |
| 2012/0224487 A1 | 9/2012 | Hui |
| 2012/0257500 A1 | 10/2012 | Lynch |
| 2012/0284791 A1 | 11/2012 | Miller |
| 2012/0290669 A1 | 11/2012 | Parks |
| 2012/0290919 A1 | 11/2012 | Melnyk |
| 2012/0291102 A1 | 11/2012 | Cohen |
| 2012/0314580 A1 | 12/2012 | Hong |

(56) References Cited

U.S. PATENT DOCUMENTS

| | | |
|---|---|---|
| 2012/0317307 A1 | 12/2012 | Ravindran |
| 2012/0317655 A1* | 12/2012 | Zhang ................ G06F 21/6218 726/28 |
| 2012/0331112 A1 | 12/2012 | Chatani |
| 2013/0041982 A1 | 2/2013 | Shi |
| 2013/0051392 A1 | 2/2013 | Filsfils |
| 2013/0060962 A1 | 3/2013 | Wang |
| 2013/0073552 A1 | 3/2013 | Rangwala |
| 2013/0074155 A1 | 3/2013 | Huh |
| 2013/0091539 A1 | 4/2013 | Khurana |
| 2013/0110987 A1 | 5/2013 | Kim |
| 2013/0111063 A1 | 5/2013 | Lee |
| 2013/0151584 A1 | 6/2013 | Westphal |
| 2013/0163426 A1 | 6/2013 | Beliveau |
| 2013/0166668 A1 | 6/2013 | Byun |
| 2013/0173822 A1 | 7/2013 | Hong |
| 2013/0182568 A1 | 7/2013 | Lee |
| 2013/0185406 A1 | 7/2013 | Choi |
| 2013/0197698 A1 | 8/2013 | Shah |
| 2013/0198119 A1 | 8/2013 | Eberhardt, III |
| 2013/0219038 A1 | 8/2013 | Lee |
| 2013/0219081 A1 | 8/2013 | Qian |
| 2013/0219478 A1 | 8/2013 | Mahamuni |
| 2013/0223237 A1 | 8/2013 | Hui |
| 2013/0227166 A1 | 8/2013 | Ravindran |
| 2013/0242996 A1 | 9/2013 | Varvello |
| 2013/0250809 A1 | 9/2013 | Hui |
| 2013/0275752 A1* | 10/2013 | Zhang ..................... H04L 9/008 713/167 |
| 2013/0282854 A1 | 10/2013 | Jang |
| 2013/0282860 A1 | 10/2013 | Zhang |
| 2013/0282920 A1 | 10/2013 | Zhang |
| 2013/0304937 A1 | 11/2013 | Lee |
| 2013/0329696 A1 | 12/2013 | Xu |
| 2013/0336323 A1 | 12/2013 | Srinivasan |
| 2013/0343408 A1 | 12/2013 | Cook |
| 2014/0003232 A1 | 1/2014 | Guichard |
| 2014/0006565 A1 | 1/2014 | Muscariello |
| 2014/0029445 A1 | 1/2014 | Hui |
| 2014/0032714 A1 | 1/2014 | Liu |
| 2014/0040505 A1 | 2/2014 | Barton |
| 2014/0074730 A1 | 3/2014 | Arensmeier |
| 2014/0075567 A1 | 3/2014 | Raleigh |
| 2014/0082135 A1 | 3/2014 | Jung |
| 2014/0089454 A1 | 3/2014 | Jeon |
| 2014/0096249 A1 | 4/2014 | Dupont |
| 2014/0129736 A1 | 5/2014 | Yu |
| 2014/0136814 A1 | 5/2014 | Stark |
| 2014/0140348 A1 | 5/2014 | Perlman |
| 2014/0143370 A1 | 5/2014 | Vilenski |
| 2014/0146819 A1 | 5/2014 | Bae |
| 2014/0149733 A1 | 5/2014 | Kim |
| 2014/0156396 A1 | 6/2014 | deKozan |
| 2014/0165207 A1 | 6/2014 | Engel |
| 2014/0172783 A1 | 6/2014 | Suzuki |
| 2014/0172981 A1 | 6/2014 | Kim |
| 2014/0173034 A1 | 6/2014 | Liu |
| 2014/0192717 A1 | 7/2014 | Liu |
| 2014/0195328 A1 | 7/2014 | Ferens |
| 2014/0195666 A1 | 7/2014 | Dumitriu |
| 2014/0233575 A1 | 8/2014 | Xie |
| 2014/0237085 A1 | 8/2014 | Park |
| 2014/0280823 A1 | 9/2014 | Varvello |
| 2014/0281489 A1* | 9/2014 | Peterka et al. ................ 713/153 |
| 2014/0281505 A1 | 9/2014 | Zhang |
| 2014/0282816 A1 | 9/2014 | Xie |
| 2014/0289325 A1 | 9/2014 | Solis |
| 2014/0289790 A1 | 9/2014 | Wilson |
| 2014/0314093 A1 | 10/2014 | You |
| 2014/0365550 A1 | 12/2014 | Jang |
| 2015/0006896 A1 | 1/2015 | Franck |
| 2015/0018770 A1 | 1/2015 | Baran |
| 2015/0032892 A1 | 1/2015 | Narayanan |
| 2015/0063802 A1 | 3/2015 | Bahadur |
| 2015/0095481 A1 | 4/2015 | Ohnishi |
| 2015/0095514 A1 | 4/2015 | Yu |
| 2015/0188770 A1 | 7/2015 | Naiksatam |

FOREIGN PATENT DOCUMENTS

| | | |
|---|---|---|
| EP | 0295727 A2 | 12/1988 |
| EP | 0757065 A2 | 7/1996 |
| EP | 1077422 A2 | 2/2001 |
| EP | 1384729 A1 | 1/2004 |
| EP | 2124415 A2 | 11/2009 |
| EP | 2214357 A1 | 8/2010 |
| WO | 03005288 A2 | 1/2003 |
| WO | 03042254 A1 | 5/2003 |
| WO | 03049369 A2 | 6/2003 |
| WO | 03091297 A1 | 11/2003 |
| WO | 2007113180 A1 | 10/2007 |
| WO | 2007144388 A1 | 12/2007 |
| WO | WO 2007144388 A1 * | 12/2007 .......... H04L 2209/80 |
| WO | 2011049890 A1 | 4/2011 |

OTHER PUBLICATIONS

J. Bethencourt, A. Sahai, and B. Waters. Ciphertext-Policy Attribute-Based Encryption. 2007 IEEE Symposium on Security and Privacy, SP'07 (2007).

D. Boneh and M. Franklin. Identity-Based Encryption from the Weil Pairing. Advances in Cryptology—CRYPTO 2001, vol. 2139, Springer Berlin Heidelberg (2001).

M. Blaze, G. Bleumer, and M. Strauss. Divertible Protocols and Atomic Proxy Cryptography. In Proceedings of Eurocrypt 98 1403 (1998).

Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE INFOCOM 2012 (2012).

Sandvine, Global Internet Phenomena Report—Spring 2012. Located online at http://www.sandvine.com/downloads/documents/Phenomena1H 2012/Sandvine Global Internet Phenomena Report 1H 2012.pdf.

V. K. Adhikari, S. Jain, Y. Chen, and Z.-L. Zhang. Vivisecting Youtube: An Active Measurement Study. In INFOCOM12 Mini-conference (2012).

Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking (Feb. 2009).

RTMP (2009). Available online at http://wwwimages.adobe.com/www.adobe.com/content/dam/Adobe/en/devnet/rtmp/pdf/rtmp specification 1.0.pdf.

The Despotify Project (2012). Available online at http://despotify.sourceforge.net/.

H. Xiong, X. Zhang, W. Zhu, and D. Yao. CloudSeal: End-to-End Content Protection in Cloud-based Storage and Delivery Services. Security and Privacy in Communication Networks. Springer Berlin Heidelberg (2012).

S. Kamara and K. Lauter. Cryptographic Cloud Storage. Financial Cryptography and Data Security. Springer Berlin Heidelberg (2010).

J. Lotspiech, S. Nusser, and F. Pestoni. Anonymous Trust: Digital Rights Management using Broadcast Encryption. Proceedings of the IEEE 92.6 (2004).

D. Boneh, C. Gentry, and B. Waters. Collusion Resistant Broadcast Encryption With Short Ciphertexts and Private Keys. In proceedings of Crypto '05, LNCS 3621 (2005).

S. Chow, J. Weng, Y. Yang, and R. Deng. Efficient Unidirectional Proxy Re-Encryption. Progress in Cryptology—AFRICACRYPT 2010. Springer Berlin Heidelberg (2010).

C. Gentry and A. Silverberg. Hierarchical ID-Based Cryptography. Advances in Cryptology—ASIACRYPT 2002. Springer Berlin Heidelberg (2002).

R. H. Deng, J. Weng, S. Liu, and K. Chen. Chosen-Ciphertext Secure Proxy Re-Encryption without Pairings. CANS. Spring Lecture Notes in Computer Science vol. 5339 (2008).

(56) References Cited

OTHER PUBLICATIONS

J. Shao and Z. Cao. CCA-Secure Proxy Re-Encryption without Pairings. Public Key Cryptography. Springer Lecture Notes in Computer Sciencevol. 5443 (2009).
Jacobson, Van et al. 'VoCCN: Voice Over Content-Centric Networks.' Dec. 1, 2009. ACM ReArch'09.
Rosenberg, J. "Interactive Connectivity Establishment (ICE): A Protocol for Network Address Translator (NAT) Traversal for Offer/Answer Protocols", Apr. 2010, pp. 1-117.
Shih, Eugene et al., 'Wake on Wireless: An Event Driven Energy Saving Strategy for Battery Operated Devices', Sep. 23, 2002, pp. 160-171.
Jacobson, Van et al., "Content-Centric Networking, Whitepaper Describing Future Assurable Global Networks", Palo Alto Research Center, Inc., Jan. 30, 2007, pp. 1-9.
Koponen, Teemu et al., "A Data-Oriented (and Beyond) Network Architecture", SIGCOMM '07, Aug. 27-31, 2007, Kyoto, Japan, XP-002579021, p. 181-192.
Fall, K. et al., "DTN: an architectural retrospective", Selected areas in communications, IEEE Journal on, vol. 28, No. 5, Jun. 1, 2008, pp. 828-835.
Gritter, M. et al., 'An Architecture for content routing support in the Internet', Proceedings of 3rd Usenix Symposium on Internet Technologies and Systems, 2001, pp. 37-48.
"CCNx," http://ccnx.org/. downloaded Mar. 11, 2015.
"Content Delivery Network", Wikipedia, Dec. 10, 2011, http://en.wikipedia.org/w/index.php?title=Content_delivery_network&oldid=465077460.
"Digital Signature" archived on Aug. 31, 2009 at http://web.archive.org/web/20090831170721/http://en.wikipedia.org/wiki/Digital_signature.
"Introducing JSON," http://www.json.org/. downloaded Mar. 11, 2015.
"Microsoft PlayReady," http://www.microsoft.com/playready/. downloaded Mar. 11, 2015.
"Pursuing a pub/sub internet (PURSUIT)," http://www.fp7-pursuit.ew/PursuitWeb/. downloaded Mar. 11, 2015.
"The FP7 4WARD project," http://www.4ward-project.eu/. downloaded Mar. 11, 2015.
A. Broder and A. Karlin, "Multilevel Adaptive Hashing", Jan. 1990, pp. 43-53.
Detti, Andrea, et al. "CONET: a content centric inter-networking architecture." Proceedings of the ACM SIGCOMM workshop on Information-centric networking. ACM, 2011.
A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.
Afanasyev, Alexander, et al. "Interest flooding attack and countermeasures in Named Data Networking." IFIP Networking Conference, 2013. IEEE, 2013.
B. Ahlgren et al., 'A Survey of Information-centric Networking' IEEE Commun. Magazine, Jul. 2012, pp. 26-36.
Bari, MdFaizul, et al. 'A survey of naming and routing in information-centric networks.' Communications Magazine, IEEE 50.12 (2012): 44-53.
Baugher, Mark et al., "Self-Verifying Names for Read-Only Named Data", 2012 IEEE Conference on Computer Communications Workshops (INFOCOM WKSHPS), Mar. 2012, pp. 274-279.
Brambley, Michael, A novel, low-cost, reduced-sensor approach for providing smart remote monitoring and diagnostics for packaged air conditioners and heat pumps. Pacific Northwest National Laboratory, 2009.
C.A. Wood and E. Uzun, "Flexible end-to-end content security in CCN," in Proc. IEEE CCNC 2014, Las Vegas, CA, USA, Jan. 2014.
Carzaniga, Antonio, Matthew J. Rutherford, and Alexander L. Wolf. 'A routing scheme for content-based networking.' INFOCOM 2004. Twenty-third Annual Joint Conference of the IEEE Computer and Communications Societies. vol. 2. IEEE, 2004.
Cho, Jin-Hee, Ananthram Swami, and Ray Chen. "A survey on trust management for mobile ad hoc networks." Communications Surveys & Tutorials, IEEE 13.4 (2011): 562-583.
Compagno, Alberto, et al. "Poseidon: Mitigating interest flooding DDoS attacks in named data networking." Local Computer Networks (LCN), 2013 IEEE 38th Conference on. IEEE, 2013.
Conner, William, et al. "A trust management framework for service-oriented environments." Proceedings of the 18th international conference on World wide web. ACM, 2009.
Content Centric Networking Project (CCN) [online], http://ccnx.org/releases/latest/doc/technical/, Downloaded Mar. 9, 2015.
Content Mediator Architecture for Content-aware Networks (COMET) Project [online], http://www.comet-project.org/, Downloaded Mar. 9, 2015.
D.K. Smetters, P. Golle, and J.D. Thornton, "CCNx access control specifications," PARC, Tech. Rep., Jul. 2010.
Dabirmoghaddam, Ali, Maziar Mirzazad Barijough, and J. J. Garcia-Luna-Aceves. 'Understanding optimal caching and opportunistic caching at the edge of information-centric networks.' Proceedings of the 1st international conference on Information-centric networking. ACM, 2014.
Detti et al., "Supporting the Web with an information centric network that routes by name", Aug. 2012, Computer Networks 56, pp. 3705-3702.
Dijkstra, Edsger W., and Carel S. Scholten. 'Termination detection for diffusing computations.' Information Processing Letters 11.1 (1980): 1-4.
Dijkstra, Edsger W., Wim HJ Feijen, and A_J M. Van Gasteren. "Derivation of a termination detection algorithm for distributed computations." Control Flow and Data Flow: concepts of distributed programming. Springer Berlin Heidelberg, 1986. 507-512.
E. Rescorla and N. Modadugu, "Datagram transport layer security," IETF RFC 4347, Apr. 2006.
E.W. Dijkstra, W. Feijen, and A.J.M. Van Gasteren, "Derivation of a Termination Detection Algorithm for Distributed Computations," Information Processing Letter, vol. 16, No. 5, 1983.
Fayazbakhsh, S. K., Lin, Y., Tootoonchian, A., Ghodsi, A., Koponen, T., Maggs, B., & Shenker, S. {Aug. 2013). Less pain, most of the gain: Incrementally deployable ICN. In ACM SIGCOMM Computer Communication Review (vol. 43, No. 4, pp. 147-158). ACM.
G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.
G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.
G. Xylomenos et al., "A Survey of Information-centric Networking Research," IEEE Communication Surveys and Tutorials, Jul. 2013.
Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.
Garcia-Luna-Aceves, Jose J. 'A unified approach to loop-free routing using distance vectors or link states.' ACM SIGCOMM Computer Communication Review. vol. 19. No. 4. ACM, 1989.
Garcia-Luna-Aceves, Jose J. 'Name-Based Content Routing in Information Centric Networks Using Distance Information' Proc ACM ICN 2014, Sep. 2014.
Ghali, Cesar, GeneTsudik, and Ersin Uzun. "Needle in a Haystack: Mitigating Content Poisoning in Named-Data Networking." Proceedings of NDSS Workshop on Security of Emerging Networking Technologies (SENT). 2014.
Ghodsi, Ali, et al. "Information-centric networking: seeing the forest for the trees." Proceedings of the 10th ACM Workshop on Hot Topics in Networks. ACM, 2011.
Ghodsi, Ali, et al. "Naming in content-oriented architectures." Proceedings of the ACM SIGCOMM workshop on Information-centric networking. ACM, 2011.
Gupta, Anjali, Barbara Liskov, and Rodrigo Rodrigues. "Efficient Routing for Peer-to-Peer Overlays." NSDI. vol. 4. 2004.
Heckerman, David, John S. Breese, and Koos Rommelse. "Decision-Theoretic Troubleshooting." Communications of the ACM. 1995.

(56) References Cited

OTHER PUBLICATIONS

Heinemeier, Kristin, et al. "Uncertainties in Achieving Energy Savings from HVAC Maintenance Measures in the Field." ASHRAE Transactions 118.Part 2 {2012).
Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2012).
Hoque et al., 'NLSR: Named-data Link State Routing Protocol', Aug. 12, 2013, ICN 2013, pp. 15-20.
https://code.google.com/p/ccnx-trace/.
I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.
Intanagonwiwat, Chalermek, Ramesh Govindan, and Deborah Estrin. 'Directed diffusion: a scalable and robust communication paradigm for sensor networks.' Proceedings of the 6th annual international conference on Mobile computing and networking. ACM, 2000.
J. Aumasson and D. Bernstein, "SipHash: a fast short-input PRF", Sep. 18, 2012.
J. Hur, "Improving security and efficiency in attribute-based data sharing," IEEE Trans. Knowledge Data Eng., vol. 25, No. 10, pp. 2271-2282, Oct. 2013.
V. Jacobson et al., 'Networking Named Content,' Proc. IEEE CoNEXT '09, Dec. 2009.
Jacobson et al., "Custodian-Based Information Sharing," Jul. 2012, IEEE Communications Magazine: vol. 50 Issue 7 (p. 3843).
Ji, Kun, et al. "Prognostics enabled resilient control for model-based building automation systems." Proceedings of the 12th Conference of International Building Performance Simulation Association. 2011.
K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.
Katipamula, Srinivas, and Michael R. Brambley. "Review article: methods for fault detection, diagnostics, and prognostics for building systemsa review, Part I." HVAC&R Research 11.1 (2005): 3-25.
Katipamula, Srinivas, and Michael R. Brambley. "Review article: methods for fault detection, diagnostics, and prognostics for building systemsa review, Part II." HVAC&R Research 11.2 (2005): 169-187.
L. Wang et al., 'OSPFN: An OSPF Based Routing Protocol for Named Data Networking,' Technical Report NDN-0003, 2012.
L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.
Li, Wenjia, Anupam Joshi, and Tim Finin. "Coping with node misbehaviors in ad hoc networks: A multi-dimensional trust management approach." Mobile Data Management (MDM), 2010 Eleventh International Conference on. IEEE, 2010.
Lopez, Javier, et al. "Trust management systems for wireless sensor networks: Best practices." Computer Communications 33.9 (2010): 1086-1093.
M. Green and G. Ateniese, "Identity-based proxy re-encryption," in Proc. ACNS 2007, Zhuhai, China, Jun. 2007, pp. 288-306.
M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.
M. Naor and B. Pinkas "Efficient trace and revoke schemes," in Proc. FC 2000, Anguilla, British West Indies, Feb. 2000, pp. 1-20.
M. Nystrom, S. Parkinson, A. Rusch, and M. Scott, "PKCS#12: Personal information exchange syntax v. 1.1," IETF RFC 7292, K. Moriarty, Ed., Jul. 2014.
M. Parsa and J.J. Garcia-Luna-Aceves, "A Protocol for Scalable Loop-free Multicast Routing." IEEE JSAC, Apr. 1997.
M. Walfish, H. Balakrishnan, and S. Shenker, "Untangling the web from DNS," in Proc. USENIX NSDI 2004, Oct. 2010, pp. 735-737.
Mahadevan, Priya, et al. "Orbis: rescaling degree correlations to generate annotated internet topologies." ACM SIGCOMM Computer Communication Review. vol. 37. No. 4. ACM, 2007.
Mahadevan, Priya, et al. "Systematic topology analysis and generation using degree correlations." ACM SIGCOMM Computer Communication Review. vol. 36. No. 4. ACM, 2006.
Matocha, Jeff, and Tracy Camp. 'A taxonomy of distributed termination detection algorithms.' Journal of Systems and Software 43.3 (1998): 207-221.
Matted Varvello et al., "Caesar: A Content Router for High Speed Forwarding", ICN 2012, Second Edition on Information-Centric Networking, New York, Aug. 2012.
McWilliams, Jennifer A., and Iain S. Walker. "Home Energy Article: A Systems Approach to Retrofitting Residential HVAC Systems." Lawrence Berkeley National Laboratory (2005).
Merindol et al., "An efficient algorithm to enable path diversity in link state routing networks", Jan. 10, Computer Networks 55 (2011), pp. 1132-1140.
Mobility First Project [online], http://mobilityfirst.winlab.rutgers.edu/, Downloaded Mar. 9, 2015.
Narasimhan, Sriram, and Lee Brownston. "HyDE—A General Framework for Stochastic and Hybrid Modelbased Diagnosis." Proc. DX 7 (2007): 162-169.
NDN Project [online], http://www.named-data.net/, Downloaded Mar. 9, 2015.
Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.
P. Mahadevan, E.Uzun, S. Sevilla, and J. Garcia-Luna-Aceves, "CCN-krs: A key resolution service for ccn," in Proceedings of the 1st International Conference on Information-centric Networking, Ser. INC 14 New York, NY, USA: ACM, 2014, pp. 97-106. [Online]. Available: http://doi.acm.org/10.1145/2660129.2660154.
S. Deering, "Multicast Routing in Internetworks and Extended LANs," Proc. ACM SIGCOMM '88, Aug. 1988.
S. Deering et al., "The PIM architecture for wide-area multicast routing," IEEE/ACM Trans, on Networking, vol. 4, No. 2, Apr. 1996.
S. Jahid, P. Mittal, and N. Borisov, "EASiER: Encryption-based access control in social network with efficient revocation," in Proc. ACM ASIACCS 2011, Hong Kong, China, Mar. 2011, pp. 411-415.
S. Kamara and K. Lauter, "Cryptographic cloud storage," in Proc. FC 2010, Tenerife, Canary Islands, Spain, Jan. 2010, pp. 136-149.
S. Kumar et al. "Peacock Hashing: Deterministic and Updatable Hashing for High Performance Networking," 2008, pp. 556-564.
S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.
S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.
S.J. Lee, M. Gerla, and C. Chiang, "On-demand Multicast Routing Protocol in Multihop Wireless Mobile Networks," Mobile Networks and Applications, vol. 7, No. 6, 2002.
Scalable and Adaptive Internet Solutions (SAIL) Project [online], http://sail-project.eu/ Downloaded Mar. 9, 2015.
Schein, Jeffrey, and Steven T. Bushby. A Simulation Study of a Hierarchical, Rule-Based Method for System-Level Fault Detection and Diagnostics in HVAC Systems. US Department of Commerce,[Technology Administration], National Institute of Standards and Technology, 2005.
Shani, Guy, Joelle Pineau, and Robert Kaplow. "A survey of point-based POMDP solvers." Autonomous Agents and Multi-Agent Systems 27.1 (2013): 1-51.
Sheppard, John W., and Stephyn GW Butcher. "A formal analysis of fault diagnosis with d-matrices." Journal of Electronic Testing 23.4 (2007): 309-322.
Shneyderman, Alex et al., 'Mobile VPN: Delivering Advanced Services in Next Generation Wireless Systems', Jan. 1, 2003, pp. 3-29.
Solis, Ignacio, and J. J. Garcia-Luna-Aceves. 'Robust content dissemination in disrupted environments.' proceedings of the third ACM workshop on Challenged networks. ACM, 2008.
Sun, Ying, and Daniel S. Weld. "A framework for model-based repair." AAAI. 1993.

(56) References Cited

OTHER PUBLICATIONS

T. Ballardie, P. Francis, and J. Crowcroft, "Core Based Trees (CBT)," Proc. ACM SIGCOMM '88, Aug. 1988.

T. Dierts, "The transport layer security (TLS) protocol version 1.2," IETF RFC 5246, 2008.

T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.

V. Goyal, 0. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.

V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.

Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.

Vutukury, Srinivas, and J. J. Garcia-Luna-Aceves. A simple approximation to minimum-delay routing. vol. 29. No. 4. ACM, 1999.

W.-G. Tzeng and Z.-J. Tzeng, "A public-key traitor tracing scheme with revocation using dynamic shares," in Proc. PKC 2001, Cheju Island, Korea, Feb. 2001, pp. 207-224.

Waldvogel, Marcel "Fast Longest Prefix Matching: Algorithms, Analysis, and Applications", A dissertation submitted to the Swiss Federal Institute of Technology Zurich, 2002.

Walker, Iain S. Best practices guide for residential HVAC Retrofits. No. LBNL-53592. Ernest Orlando Lawrence Berkeley National Laboratory, Berkeley, CA (US), 2003.

Wang, Jiangzhe et al., "DMND: Collecting Data from Mobiles Using Named Data", Vehicular Networking Conference, 2010 IEEE, pp. 49-56.

Xylomenos, George, et al. "A survey of information-centric networking research." Communications Surveys & Tutorials, IEEE 16.2 (2014): 1024-1049.

Yi, Cheng, et al. 'A case for stateful forwarding plane.' Computer Communications 36.7 (2013): 779-791.

Yi, Cheng, et al. 'Adaptive forwarding in named data networking.' ACM SIGCOMM computer communication review 42.3 (2012): 62-67.

Zahariadis, Theodore, et al. "Trust management in wireless sensor networks." European Transactions on Telecommunications 21.4 (2010): 386-395.

Zhang, et al., "Named Data Networking (NDN) Project", http://www.parc.com/publication/2709/named-data-networking-ndn-project.html, Oct. 2010, NDN-0001, PARC Tech Report.

Zhang, Lixia, et al. 'Named data networking.' ACM SIGCOMM Computer Communication Review 44.3 {2014): 66-73.

Soh et al., "Efficient Prefix Updates for IP Router Using Lexicographic Ordering and Updateable Address Set", Jan. 2008, IEEE Transactions on Computers, vol. 57, No. 1.

Beben et al., "Content Aware Network based on Virtual Infrastructure", 2012 13th ACIS International Conference on Software Engineering.

Biradar et al., "Review of multicast routing mechanisms in mobile ad hoc networks", Aug. 16, Journal of Network$.

D. Trossen and G. Parisis, "Designing and realizing and information-centric internet," IEEE Communications Magazing, vol. 50, No. 7, pp. 60-67, Jul. 2012.

Garcia-Luna-Aceves et al., "Automatic Routing Using Multiple Prefix Labels", 2012, IEEE, Ad Hoc and Sensor Networking Symposium.

Gasti, Paolo et al., 'DoS & DDoS in Named Data Networking', 2013 22nd International Conference on Computer Communications and Networks (ICCCN), Aug. 2013, pp. 1-7.

Ishiyama, "On the Effectiveness of Diffusive Content Caching in Content-Centric Networking", Nov. 5, 2012, IEEE, Information and Telecommunication Technologies (APSITT), 2012 9th Asia-Pacific Symposium.

J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.

Kaya et al., "A Low Power Lookup Technique for Multi-Hashing Network Applications", 2006 IEEE Computer Society Annual Symposium on Emerging VLSI Technologies and Architectures, Mar. 2006.

Hoque et al., "NLSR: Named-data Link State Routing Protocol", Aug. 12, 2013, ICN'13.

Nadeem Javaid, "Analysis and design of quality link metrics for routing protocols in Wireless Networks", PhD Thesis Defense, Dec. 15, 2010, Universete Paris—Est.

Wetherall, David, "Active Network vision and reality: Lessons form a capsule-based system", ACM Symposium on Operating Systems Principles, Dec. 1, 1999. pp. 64-79.

Kulkarni A.B. et al., "Implementation of a prototype active network", IEEE, Open Architectures and Network Programming, Apr. 3, 1998, pp. 130-142.

Xie et al. "Collaborative Forwarding and Caching in Content Centric Networks", Networking 2012.

Amadeo et al. "Design and Analysis of a Transport-Level Solution for Content-Centric Centric VANETs", University "Mediterranea" of Reggio Calabria, Jun. 15, 2013.

Lui et al. (A TLV-Structured Data Naming Scheme for Content-Oriented Networking, pp. 5822-5827, International Workshop on the Network of the Future, Communications (ICC), 2012 IEEE International Conference on Jun. 10-15, 2012).

\* cited by examiner

SYSTEM AND METHOD FOR EFFICIENT AND SECURE DISTRIBUTION OF DIGITAL CONTENT

BACKGROUND

1. Field

This disclosure is generally related to the distribution of encrypted digital content. More specifically, this disclosure is related to processing encrypted content in a network with intermediate storage by performing decryption using a re-encryption key to transform master-encrypted content into user-specific encrypted content.

2. Related Art

The proliferation of mobile computing and cellular networks is making digital content more mobile than ever, including content such as song, videos, and movies. Content-centric network (CCN) architectures have been designed to facilitate accessing such digital content, including content that requires protection under digital rights management (DRM). Thus, it is necessary for such network architectures to include security features for accessing and distributing the digital content.

A consumer who wishes to download a song from a content producer, such as iTunes, requests the song. As part of its DRM scheme, the iTunes server sends the user an encrypted copy of the song, which the user decrypts using his own specific key. The encrypted copy of the song may pass through and be cached at an intermediate storage device on the network. If a second consumer wishes to download the same song, he requests the song from iTunes, and the iTunes server returns a differently encrypted copy of the song, which the second consumer decrypts using his own specific key. Because the consumers each use their own specific user key to decrypt the song, the system, by way of the iTunes server, creates and sends a separately encrypted version of the song for each consumer. The system cannot simply access and send to the second consumer the previously encrypted copy of the requested song which has already been cached in the intermediate storage device. This does not take advantage of the content-centric network architecture best suited for DRM.

One solution would be to provide each consumer with the same decryption key such that the previously encrypted copy of the song could be cached at the intermediate storage and sent back upon request by subsequent consumers. This would allow subsequent consumers to therefore utilize the cached copy of the encrypted song in the intermediate storage, and eliminate the need for the content producer to encrypt and send another copy of the same song. This solution would leverage the CCN infrastructure and its inherent in-networking caching capabilities. Unfortunately, providing the same key to all users contradicts the very purpose of user-specific encryption and increases the risk of security breaches within the CCN.

SUMMARY

One embodiment provides a system for processing encrypted content. During operation, a client computing device determines a request for content based on the identity of the user or the client computing device. Content is received which has been encrypted using a master encryption, where the master encryption key is not known to the client computing device. The client computing device generates an interest packet that includes a request for a user-specific re-encryption key, and, based on the information in the interest packet, receives a content object that includes the user-specific re-encryption key. The client computing device decrypts the master-encrypted content by: re-encrypting the master-encrypted content, using the user-specific re-encryption key to transform the master-encrypted content to a user-specific encrypted content; and decrypting the transformed user-specific encrypted content using a user-specific decryption key. This thereby facilitates the secure distribution of user-specific content without requiring a content source to distribute user-specific encrypted content.

In some embodiments, the interest packet generated by the client computing device can also include one or more of: a public key of the user; and a name of the content corresponding to the requested user-specific re-encryption key. In another embodiment, the interest packet generated by the client computing device can include authentication information relating to the user.

In some embodiments, the client computing device can receive a content object that, based on the information in the generated interest packet, includes information relating to pricing. The system then generates another interest packet that includes information relating to payment.

In some embodiments, an intermediate storage device in the network performs the re-encrypting of the master-encrypted data by using the user-specific re-encryption key to transform the master-encrypted data to a user-specific encrypted content, which can only be decrypted by the user-specific decryption key. The intermediate storage device can be associated with one or more of: an authorized distributor; an authorized retailer; a storage device selected specifically for a particular Internet Service Provider (ISP); and any medium capable of caching the master-encrypted content and the corresponding user-specific re-encryption key.

In some embodiments, the intermediate storage device sends the transformed user-specific encrypted content to a client computing device, so that the client computing device can decrypt the transformed user-specific encrypted content using the user-specific decryption key.

In some embodiments, a client computing device determines a request for content based on the identity of the user or the client computing device. Content is received which has been encrypted using a symmetric key, where the symmetric key has been encrypted using a master encryption key. The client computing device then generates an interest packet that includes a request for a user-specific re-encryption key, and based on the information in the interest packet, receives a content object that includes the user-specific re-encryption key. The client computing device decrypts the symmetric key-encrypted content by: re-encrypting the master-encrypted symmetric key, using the user-specific re-encryption key, to a user-specific encrypted symmetric key; decrypting the re-encrypted symmetric key using the user-specific decryption key; and decrypting the symmetric key-encrypted content using the decrypted symmetric key.

BRIEF DESCRIPTION OF THE FIGURES

In the figures, like reference numerals refer to the same figure elements.

DETAILED DESCRIPTION

Figure 1:
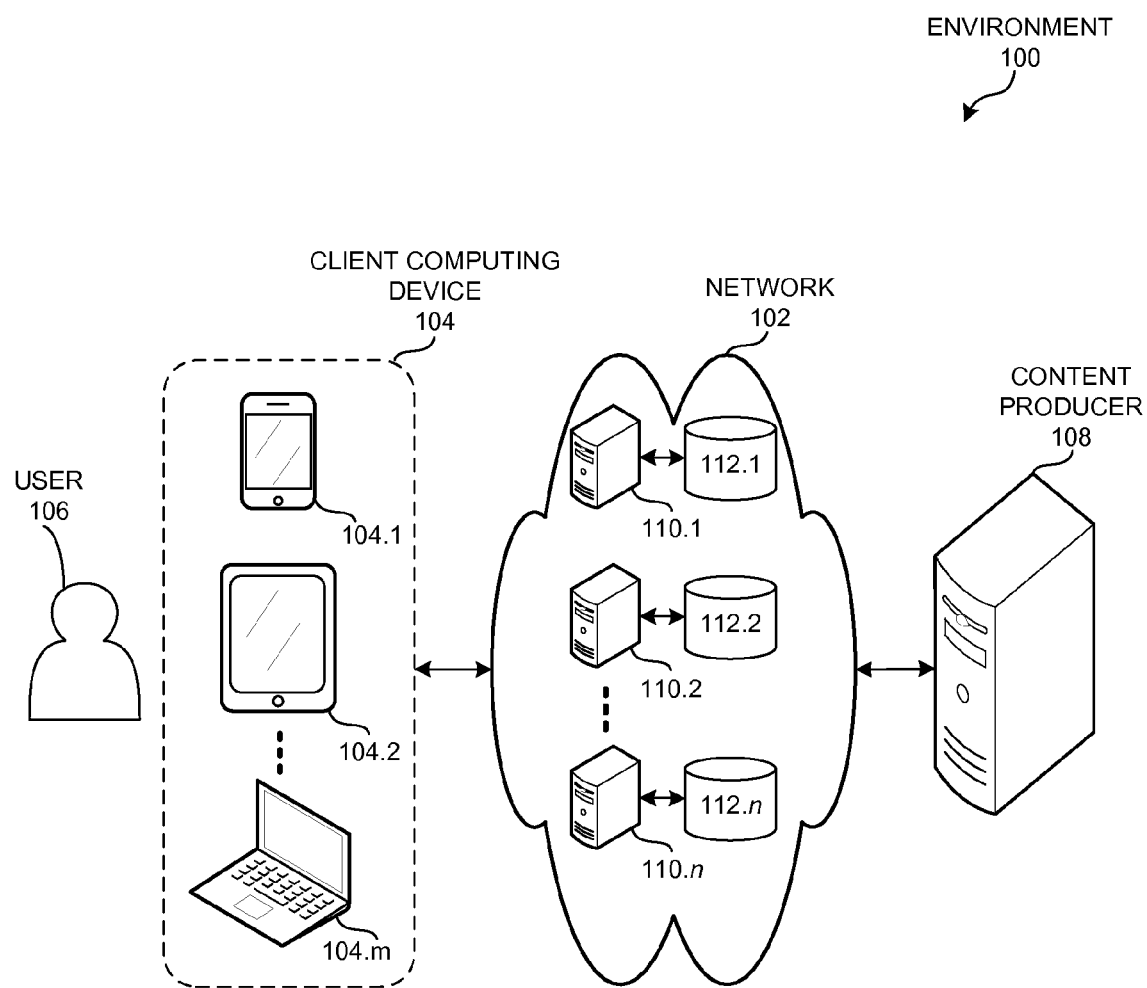
FIG. 1 illustrates an exemplary computer system that facilitates distribution of digital content in a network containing intermediate storage in accordance with an embodiment of the present invention.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a computer network environment for processing encrypted content that solve the problem of secure and efficient distribution of content to a user by using a re-encryption which both preserves the secrecy of the content and allows for re-use of a cached copy of the content by subsequent users. The computer network environment can include a content-centric network (CCN). For exemplary communication occurring within a CCN, the terms "interest" and "content object" (described below) may be used when describing the content of request and response messages. For example, a client computing device can determine a request for content, based on the identity of the user or the client computing device. The client computing device receives the requested content, which has been encrypted using a master encryption key which is not known to the client computing device. The content is then encrypted by a content producer, using a master encryption key which is known only to the content producer.

Upon receiving the master-encrypted content, the client device generates an interest packet that includes the name of the content and a request for a user-specific re-encryption key. The content producer then generates a content object which, based on the information in the interest packet, includes the user-specific re-encryption key. Once the user-specific re-encryption key is received, the client device decrypts the master-encrypted content by: 1) re-encrypting the master-encrypted content using the user-specific re-encryption key to transform the master-encrypted content to a user-specific encrypted content; and 2) decrypting the transformed user-specific encrypted content using a user-specific decryption key.

Thus, the user-specific decryption key can only decrypt the specifically transformed content (i.e., the output of the transformation of the master-encrypted content). The user-specific decryption key cannot be used on its own to decrypt the master-encrypted content. Furthermore, because the re-encryption key is user-specific, each user obtains content which has been re-encrypted specifically for him, which he can decrypt on the fly using his user-specific decryption key on any of his computing devices. This process allows the content to remain secure and also allows the user to transfer the user-specific encrypted content between his various devices.

In some embodiments, after the client device determines a request for content, the master-encrypted content and the user-specific re-encryption key may be cached in an intermediate storage device. The intermediate storage device may, for example, be an Internet Service Provider (ISP) under contract with the content producer, and is thus a trusted storage device within the content-centric network (CCN). The system may also choose a specific ISP for intermediate storage based on the requested content. Upon accessing a copy of the master-encrypted content and the user-specific re-encryption key, the intermediate storage device performs the re-encryption by: 1) re-encrypting the master-encrypted content by using the user-specific re-encryption key to transform the master-encrypted content to a user-specific encrypted content; and 2) sending the transformed user-specific encrypted content to the client device. The client device then decrypts the transformed user-specific content using the user-specific decryption key. This allows the intermediate storage device to cache both the master-encrypted content and the re-encryption key, and also perform the transformation of the re-encryption, thus leveraging the CCN infrastructure and its inherent networking caching capabilities.

In some embodiments, the network clients, network nodes (e.g., forwarders), and publishers communicate over an information-centric network (ICN). In ICN, each piece of content is individually named, and each piece of data is bound to a unique name that distinguishes the data from any other piece of data, such as other versions of the same data or data from other sources. This unique name allows a network device to request the data by disseminating a request or an Interest that indicates the unique name, and can obtain the data independent from the data's storage location, network location, application, and means of transportation. Named-data network (NDN) or a content-centric network (CCN) are examples of ICN architecture; the following terms describe elements of an NDN or CCN architecture:

Content Object:

A single piece of named data, which is bound to a unique name. Content Objects are "persistent," which means that a Content Object can move around within a computing device, or across different computing devices, but does not change. If any component of the Content Object changes, the entity that made the change creates a new Content Object that includes the updated content, and binds the new Content Object to a new unique name.

Unique Names:

A name in an ICN is typically location independent and uniquely identifies a Content Object. A data-forwarding device can use the name or name prefix to forward a packet toward a network node that generates or stores the Content Object, regardless of a network address or physical location for the Content Object. In some embodiments, the name may be a hierarchically structured variable-length identifier (HSVLI). The HSVLI can be divided into several hierarchical components, which can be structured in various ways. For example, the individual name components parc, home, ndn, and test.txt can be structured in a left-oriented prefix-major fashion to form the name "/parc/home/ndn/test.txt." Thus, the name "/parc/home/ndn" can be a "parent" or "prefix" of "/parc/home/ndn/test.txt." Additional components can be used to distinguish between different versions of the content item, such as a collaborative document.

In some embodiments, the name can include a non-hierarchical identifier, such as a hash value that is derived from the Content Object's data (e.g., a checksum value) and/or from elements of the Content Object's name. A description of a hash-based name is described in U.S. patent application Ser. No. 13/847,814 (entitled "ORDERED-ELEMENT NAMING FOR NAME-BASED PACKET FORWARDING," by inventor Ignacio Solis, filed 20 Mar. 2013), which is hereby incorporated by reference. A name can also be a flat label. Hereinafter, "name" is used to refer to any name for a piece of data in a name-data network, such as a hierarchical name or name prefix, a flat name, a fixed-length name, an arbitrary-length name, or a label (e.g., a Multiprotocol Label Switching (MPLS) label).

Interest:

A packet that indicates a request for a piece of data, and includes a name (or a name prefix) for the piece of data. A data consumer can disseminate a request or Interest across an information-centric network, which CCN/NDN routers can propagate toward a storage device (e.g., a cache server) or a data producer that can provide the requested data to satisfy the request or Interest.

In some embodiments, the ICN system can include a content-centric networking (CCN) architecture. However, the methods disclosed herein are also applicable to other ICN architectures as well. A description of a CCN architecture is described in U.S. patent application Ser. No. 12/338,175 (entitled "CONTROLLING THE SPREAD OF INTERESTS AND CONTENT IN A CONTENT CENTRIC NETWORK," by inventors Van L. Jacobson and *Diana* K. Smetters, filed 18 Dec. 2008), which is hereby incorporated by reference.

FIG. 1 illustrates an exemplary computing environment 100 that facilitates distribution of digital content in a network containing intermediate storage in accordance with an embodiment of the present invention. Computing environment 100 can include a client computing device 104, which can include any computing device that can determine a request for content via a network 102. For example, client computing device 104 can include a smartphone 104.1, a tablet computer 104.2, and/or a personal computing device 104.*m* (e.g., a laptop). Specifically, client computing device 104 can request content from network 102, and may do so at the action of user 106.

Computing environment 100 can also include network 102 which can be, for example, a content-centric network (CCN) or an information-centric network (ICN). Network 102 can include intermediate storage devices 110.1-110.*n*, which can each contain storage means 112.1-112.*n*, respectively, to cache various content passed through network 102.

Computing environment 100 can include a content producer 108 that can host content requested by user 106 via client computing device 204. Content producer 108 can master-encrypt and return the requested content to client computing device 104. Upon request from client computing device 204 or one of intermediate storage devices 110.1-110.*n*, content producer 108 can also return a user-specific re-encryption key. Both the master-encrypted content and the user-specific re-encryption key may be cached in one of intermediate storage devices 110.1-110.*n* residing in network 102. The cached data may be accessed upon future requests for the data, such that content producer 108 only needs to access and generate the master-encrypted content and the user-specific re-encryption key once. Thus, in a CCN, this would efficiently utilize the networking caching capabilities of network 102.

Client computing device 104 can re-encrypt the master-encrypted content to user-specific encrypted content using the user-specific re-encryption key, and can further decrypt this transformed user-specific content by using a user-specific decryption key. In some embodiments, one of intermediate storage device 110.1-110.*n* can re-encrypt the master-encrypted content to user-specific encrypted content using the user-specific re-encryption key, and send the transformed user-specific encrypted content to client computing device 104. Client computing device 104 can then further decrypt this transformed user-specific content by using a user-specific decryption key.

Re-Encryption Performed by Client Device

Figure 2A:
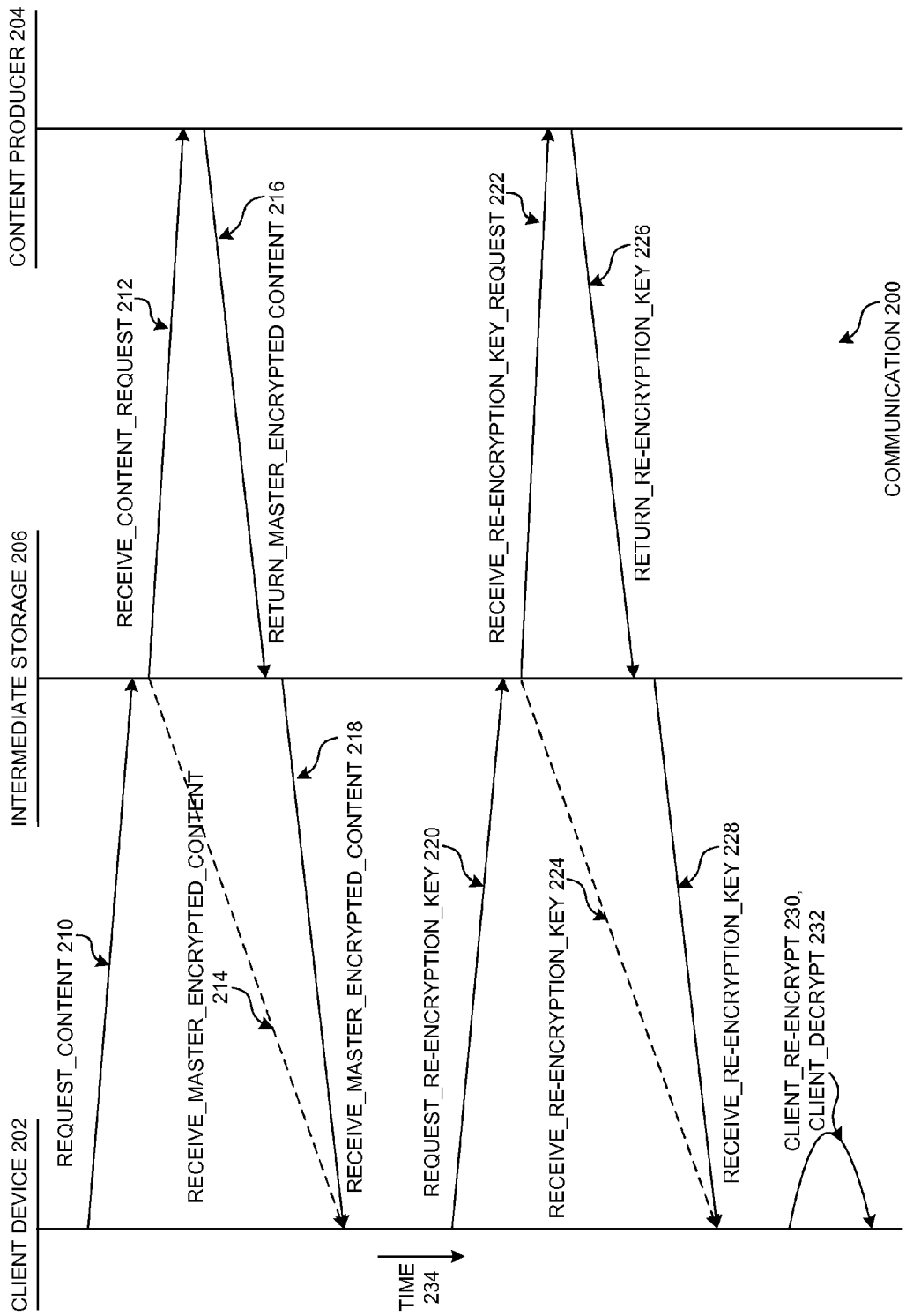
FIG. 2A illustrates exemplary communication between a client device and a content producer, including communication with an intermediate storage device, where re-encryption occurs at the client device, in accordance with an embodiment of the present invention.

FIG. 2A illustrates exemplary communication 200 between a client device 202 and a content producer 204, including communication with an intermediate storage 206, where re-encryption occurs at client device 202, in accordance with an embodiment of the present invention. The vertical lines beneath client device 202, intermediate storage 206, and content producer 204 indicate time, as shown by the time 234 label depicting time with a downward arrow. During operation, client device 202 determines a request_content message 210 based on the identity of the user or the client device 202. Request_content message 210 passes through intermediate storage 206, and content producer 204 receives this receive_content_request message 212. Content producer 204 accesses the requested content, and then performs a master encryption on the requested content based on a master encryption key. The algorithm detailing the master encryption of the content by content producer 204 is shown in the PEncrypt( ) procedure in Table 1. Content producer 204 then sends a return_master_encrypted_content message 216 back to client device 202, which message 216 first passes through and may be cached at intermediate storage 206.

Client device 202, now in possession of the master-encrypted content from receive_master_encrypted_content message 218, generates a request_re-encryption_key interest 220. This request is for a user-specific re-encryption key, and passes through intermediate storage 206. Content producer 204 then receives this receive_re-encryption_key_request interest 222, and generates a user-specific re-encryption key based on the information in the interest packet. The algorithm detailing the generation of the user-specific re-encryption key by content producer 204 is shown in the PREKeyGen( ) procedure in Table 2. Content producer 204 then sends a return_re-encryption_key content object 226 back to client device 202, which content object 226 first passes through and may be cached at intermediate storage 206.

Client device 202, now in possession of both the master-encrypted content from receive_master_encrypted_content message 218 and the user-specific re-encryption key from receive_re-encryption_key content object 228, proceeds to decrypt the master-encrypted content by performing a client_re-encrypt procedure 230, whereby client device 202 re-encrypts the master-encrypted content by using the user-specific re-encryption key to transform the master-encrypted content to a user-specific encrypted content. This user-specific encrypted content can only be decrypted by a user-specific decryption key. Then, client device 202 performs a client_decrypt procedure 232 and decrypts the user-specific encrypted content using his user-specific decryption key to obtain the requested content. The algorithm detailing the decryption of the master-encrypted content by client device 202, which encompasses both client_re-encrypt 230 and client_decrypt 232, is shown in the CDecrypt( ) procedure in Table 3.

Sample Algorithms Used

The below algorithms list the explicit steps required for the encryption and re-encryption key generating procedures in the content producer and the re-encryption and decryption procedures in the client, in accordance with an embodiment of the invention.

TABLE 1

Content Producer Encrypt( ) algorithm.

| | |
|---|---|
| 1: | procedure PENCRYPT (M, k, params) |
| 2: | sk ← {0,1}$^k$ |
| 3: | M' ← E(K, M) |
| 4: | sk' ← Encrypt(params, N(M), sk) |
| 5: | return (M', sk') |
| 6: | end procedure |

TABLE 2

Content Producer ReKeyGen( ) algorithm.

| | |
|---|---|
| 1: | procedure PREKEYGEN (N(M), params, A) |
| 2: | $K_M$ ← KeyGen(N(M), params) |
| 3: | $rk_{M \to A}$ ← ReKeyGen(params, $K_M$, N(M), A) |
| 4: | return ($rk_{M \to A}$) |
| 5: | end procedure |

TABLE 3

Client Decrypt( ) algorithm.

| | |
|---|---|
| 1: | procedure CDECRYPT (params, $K_A$, $rk_{M \to A}$, M', sk') |
| 2: | sk'' ← ReEncrypt(params, $rk_{M \to A}$, sk') |
| 3: | sk' ← Decrypt(params, $K_A$, sk'') |
| 4: | M ← D(sk, M') |
| 5: | return M |
| 6: | end procedure |

In these sample algorithms, E(−,−) and D(−,−) refer to Advanced Encryption Standard (AES) symmetric-key encryption and decryption, respectively, and $K_A$ is the secret key for client A generated from an offline KeyGen( ) procedure. Furthermore, the above listed sample algorithms in Tables 1-3 make calls to known algorithms used within the Proxy Re-Encryption (PRE) scheme, including the KeyGen( ), Encrypt( ), ReKeyGen( ), ReEncrypt( ), and Decrypt( ) procedures. A general explanation of these known internal PRE procedures is described herein:

KeyGen(params): Generate and output a private and public key pair. Some schemes typically specify a particular identity and master key that are used in the creation of the private key.

Encrypt(params, pk, m): Encrypt plaintext m∈M using the input public key pk (or identifier) and output the resulting level one ciphertext $c_i^1$.

ReKeyGen(params, $pk_i$, $pk_j$): Generate and output a re-encryption key $rk_{i \to j}$ using the public parameters and public keys for users i and j.

ReEncrypt(params, $rk_{i \to j}$, $c_i''$): Re-encrypt the level n ciphertext $c_i''$, which is encrypted under the public key of user i, to a new level n+1 ciphertext $c_j^{n+1}$ that may be decrypted using the secret key of user j using the re-encryption key $rk_{i \to j}$.

Decrypt(params, $sk_j$, $c_j''$): Parse the level n ciphertext $c_j''$ to determine n, decrypt the ciphertext accordingly using the secret key $sk_j$, and output the original plaintext m.

Re-Encryption Performed by Intermediate Storage

Figure 2B:
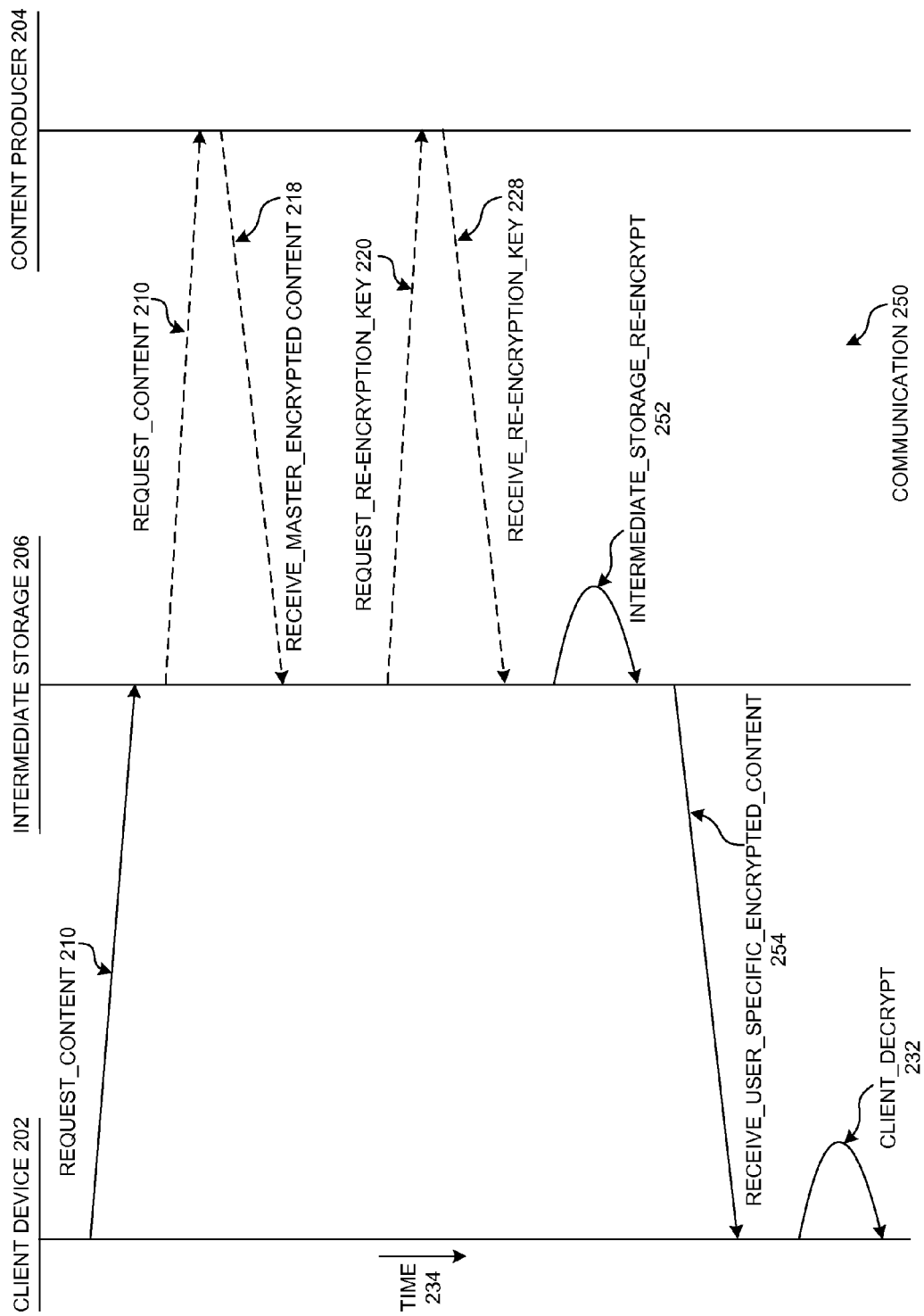
FIG. 2B illustrates exemplary communication between a client device and a content producer, including communication with an intermediate storage device, where re-encryption occurs at the intermediate storage device, in accordance with an embodiment of the present invention.

FIG. 2B illustrates exemplary communication 200 between a client device 202 and a content producer 204, including communication with an intermediate storage 206, where re-encryption occurs at intermediate storage 206, in accordance with an embodiment of the present invention. During operation, client device 202 determines a request_content message 210 based on the identity of the user or the client device 202. Request_content message 210 passes through intermediate storage 206, which then obtains the master-encrypted content by either: 1) sending request_content message 210 to content producer 204, and receiving a receive_master_encrypted_content message 218 from content producer 204, which message 218 has been master-encrypted by content producer 204 using a master encryption (see PEncrypt( ) algorithm in Table 1); or 2) accessing a previously cached copy of the master-encrypted content residing in intermediate storage 206.

Intermediate storage 206 obtains the user-specific re-encryption key by either: 1) sending a request_re-encryption_key interest 220 to content producer 204, and receiving a receive_re-encryption_key content object 228 from content producer 204, who generates a user-specific re-encryption key based on the information in the interest packet (see PReKeyGen( ) algorithm in Table 2); or 2) accessing a previously cached copy of the user-specific re-encryption key residing in intermediate storage 206.

Intermediate storage 206, now in possession of both the master-encrypted content from receive_master_encrypted_content message 218 and the user-specific re-encryption key from receive_re-encryption_key content object 228, proceeds to transform the master-encrypted content by performing an intermediate_storage_re-encrypt procedure 252, whereby intermediate storage 206 re-encrypts the master-encrypted content by using the user-specific re-encryption key to transform the master-encrypted content to a user-specific encrypted content This user-specific encrypted content can only be decrypted by a user-specific decryption key.

Intermediate storage 206 then sends this user-specific encrypted content back to client device 202. Client device 202 receives the user-specific encrypted content in a receive_user_specific_encrypted_content message 254. Client device 202 performs a client_decrypt procedure 232 and decrypts the user-specific encrypted content using his user-specific decryption key to obtain the requested content.

Further Detailed Description of Re-Encryption by Client Device

Figure 3:
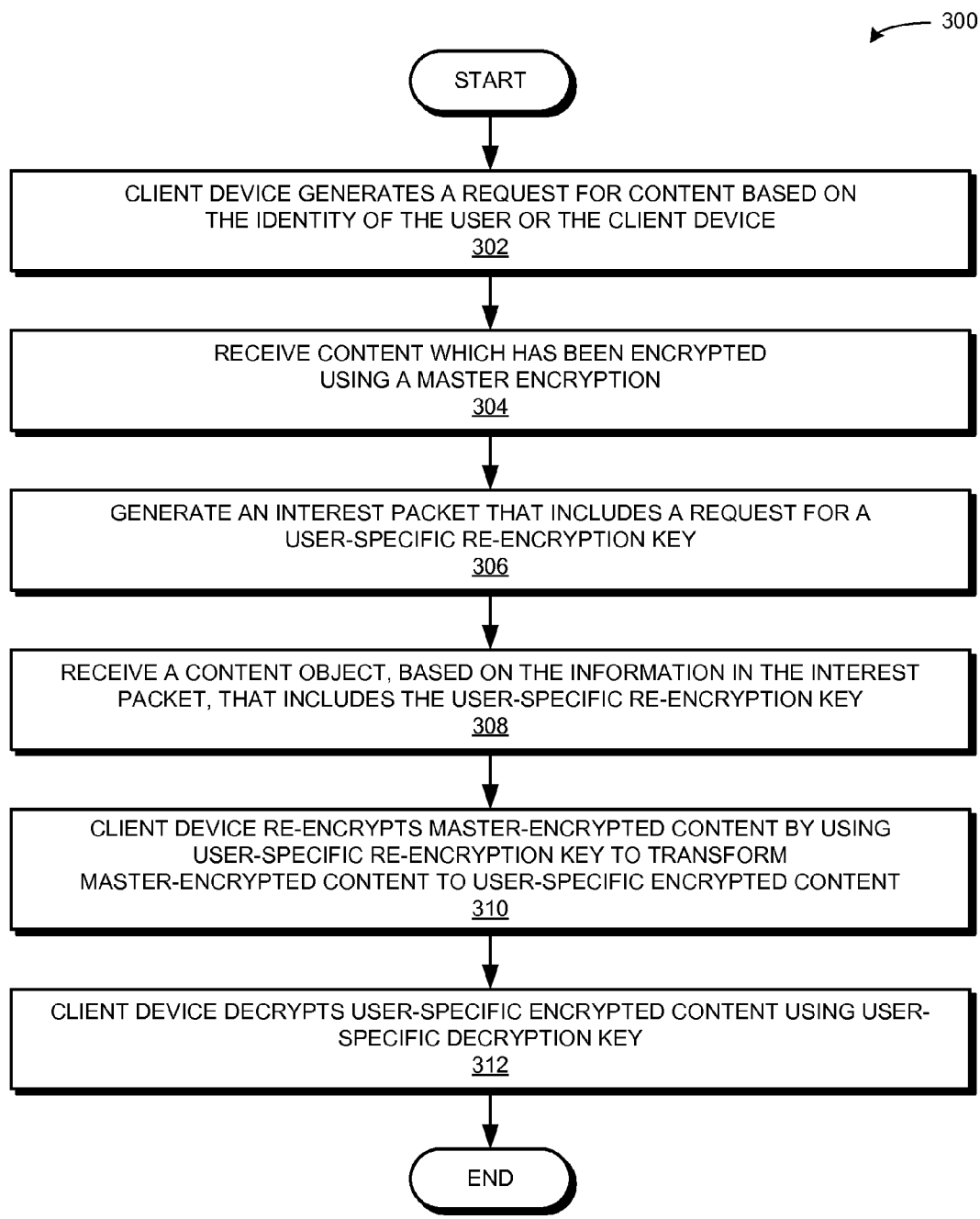
FIG. 3 presents a flow chart illustrating a method for processing encrypted content by a client device, in accordance with an embodiment of the present invention.

FIG. 3 presents a flow chart illustrating a method 300 for processing encrypted content by a client device, in accordance with an embodiment of the present invention. During operation, the client device can generate a request for content based on the identity of the user or the client device (operation 302). The client device then receives content which has been encrypted by, e.g., a content producer, based on a master encryption key that is not known to the client device (operation 304). The client device now possesses a copy of the requested content, which has been encrypted using a master encryption.

In order to decrypt the master-encrypted content, the client device obtains a re-encryption key, which is specific to the particular requesting user. So, the client device generates an interest packet that includes a request for a user-specific re-encryption key (operation 306). The client device then receives the requested user-specific re-encryption key which has been generated by, e.g., a content producer. In a CCN, this message could comprise a content object that includes the requested user-specific re-encryption key (operation 308).

The client device then re-encrypts the master-encrypted content by using the user-specific re-encryption key to transform the master-encrypted content to user-specific encrypted content (operation 310). Because the re-encryption key is specific to the user, the transformed content is also specific to the user, such that the only way to finally decrypt the user-specific encrypted content is to use the user-specific decryption key (operation 312). Furthermore, because the transformation occurs for each user, each user obtains a specifically encrypted version of the content, which he can decrypt on the fly, using his user-specific decryption key, on any of his computing devices. This provides a secure manner of storage for the content, and also provides the user with an efficient way to transfer this user-specific encrypted content between his various devices.

Figure 4A:
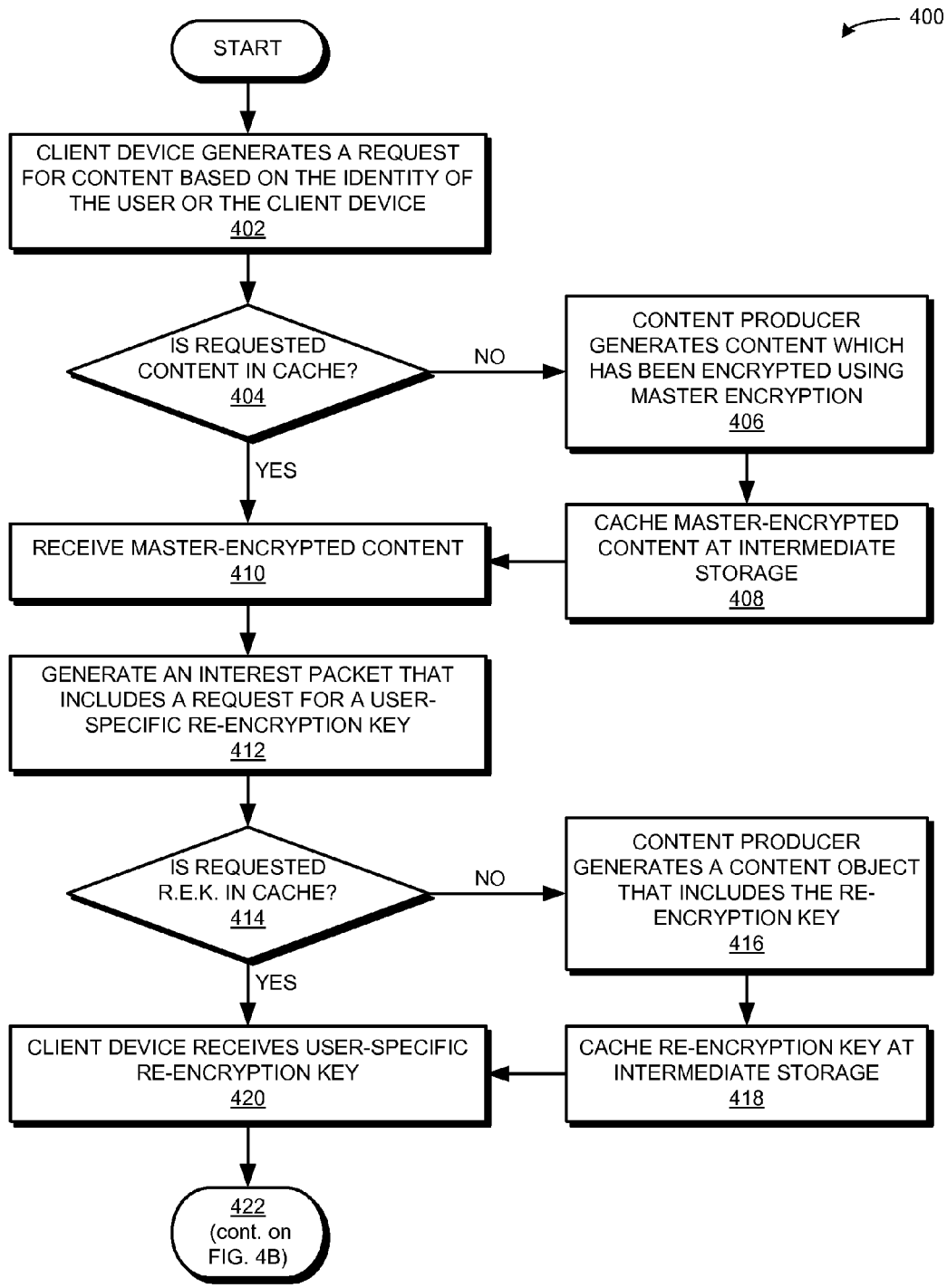
FIGS. 4A and 4B present a flow chart illustrating a method for processing encrypted content, where requested content may reside in a cache and re-encryption occurs at the client device, in accordance with an embodiment of the present invention.
Figure 4B:
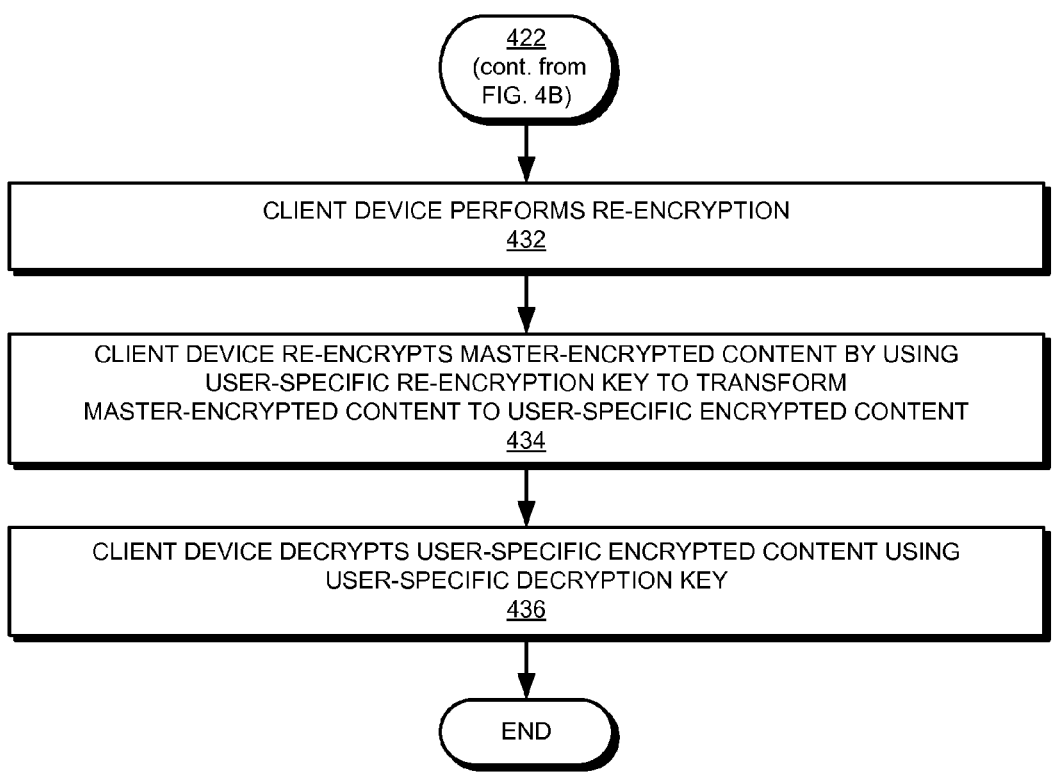

FIGS. 4A and 4B present a flow chart illustrating a method 400 for processing encrypted content, where re-encryption occurs at the client device, and furthermore, where the master-encrypted content and the user-specific re-encryption key can both be stored in the cache of the intermediate storage. During operation, the client device can generate a request for content based on the identity of the user or the client device (operation 402). The system then determines whether the requested content already resides in the cache of an intermediate storage (operation 404). If the requested content does not reside in the cache of an intermediate storage, then the request is sent on to a content producer. The content producer generates master-encrypted content which has been encrypted based on a master encryption key that is known only to the content producer (operation 406). As a corollary, the master encryption key is also not known to any of the client devices or intermediate storage devices within the system. The content producer then returns the master-encrypted content to the client device, and the system caches the master-encrypted content at intermediate storage along the way (operation 408). The client device then receives the master-encrypted content (operation 410).

If the requested content does reside in the cache of intermediate storage, then the client device simply receives the master-encrypted content (operation 410). In order to decrypt the master-encrypted content, the client device obtains a user-specific re-encryption key. As in the example of a CCN, the client device generates an interest packet that includes a request for a user-specific re-encryption key (operation 412). The system again determines whether the requested user-specific re-encryption key resides in the cache of an intermediate storage (operation 414). If the requested user-specific re-encryption key does not reside in the cache of an intermediate storage, then the request is sent on to a content producer. The content producer generates a user-specific re-encryption key (operation 416). The content producer then returns the user-specific re-encryption key to the client device, and the system caches the user-specific re-encryption key at intermediate storage along the way (operation 418). The client device then receives the user-specific re-encryption key (operation 420).

If the requested user-specific re-encryption key does reside in the cache of intermediate storage, then the client device simply receives the user-specific re-encryption key (operation 420). FIG. 4B presents the continuation of method 400 of FIG. 4A. The client device performs re-encryption (operation 432) by first re-encrypting the master-encrypted content, using the user-specific re-encryption key, transforming the master-encrypted content to user-specific encrypted content (operation 434), and then decrypting the user-specific encrypted content by using a user-specific decryption key (operation 436).

Thus, the system can make efficient use of the cached versions of previously requested and processed content (here, the master-encrypted content and the user-specific re-encryption key), by way of smart intermediate storage devices in the network. This, along with the use of the user-specific re-encryption key to transform the master-encrypted content to user-specific encrypted content, provides an efficient and secure manner of distribution of digital content that requires protection under DRM within a CCN.

Further Detailed Description of Re-Encryption by Intermediate Storage

Figure 4C:
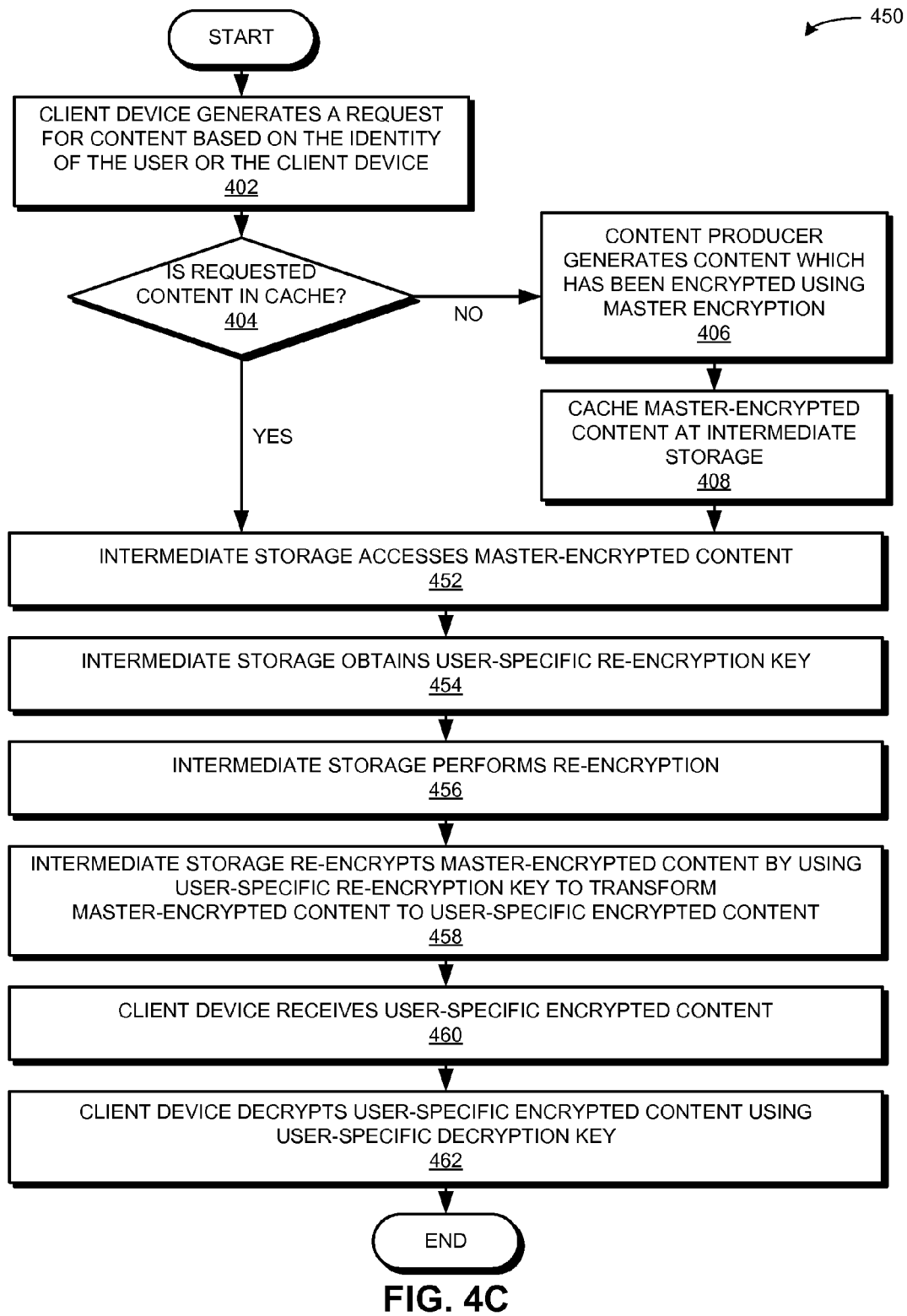
FIG. 4C presents a flow chart illustrating a method for processing encrypted content, where requested content may reside in a cache and re-encryption occurs at the intermediate storage device, in accordance with an embodiment of the present invention.

FIG. 4C presents a flow chart illustrating a method 450 for processing encrypted content, where re-encryption occurs at the intermediate storage device, and where the master-encrypted content and the user-specific re-encryption key are both stored in the cache of the intermediate storage. During operation, the client device can generate a request for content based on the identity of the user or the client device (operation 402). As above in FIG. 4A, the system then determines whether the requested content already resides in the cache of an intermediate storage (operation 404). If the requested content does not reside in the cache of an intermediate storage, then the request is sent on to a content producer. The content producer generates master-encrypted content which has been encrypted based on a master encryption key that is known only to the content producer (operation 406). The content producer then returns the master-encrypted content to intermediate storage, and the intermediate storage caches the master-encrypted content (operation 408). The intermediate storage may then access the master-encrypted content residing in its cache (operation 452).

If the requested content does reside in the cache of intermediate storage, then the intermediate storage accesses the master-encrypted content in its cache (operation 452). The intermediate storage then obtains the user-specific re-encryption key (operation 454), by sending a request to and receiving a response from, e.g., the content producer. The intermediate storage then performs a re-encryption (operation 456) by re-encrypting the master-encrypted content, using the user-specific re-encryption key, to transform the master-encrypted content to user-specific encrypted content (operation 458). The intermediate storage then returns, and the client device then receives, the transformed user-specific encrypted content (operation 460). Finally, the client device decrypts the user-specific encrypted content using a user-specific decryption key (operation 462).

Payment and Pricing

Figure 5:
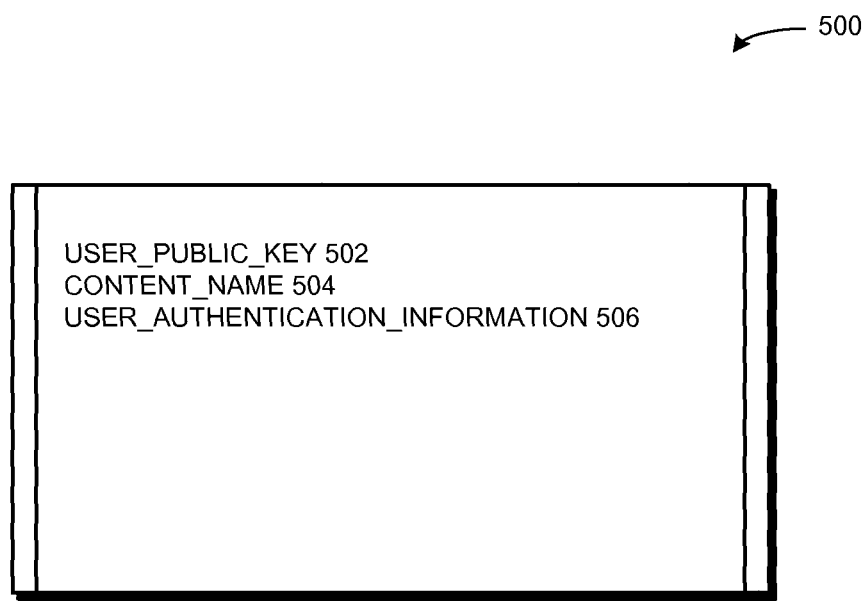
FIG. 5 illustrates the contents of a generated interest packet, in accordance with an embodiment of the present invention.

FIG. 5 illustrates the contents of a generated interest packet 500, in accordance with an embodiment of the present invention. Interest packet 500 may be generated by a client device when the client device, in possession of master-encrypted content, requests a user-specific re-encryption key. Interest packet 500 may include user_public_key 502 of the user, content_name 504 of the content requested by the user, and user_authentication_information 506 of the user. The contents of interest packet 500 may be used for additional communication with a client computing device.

Figure 6:
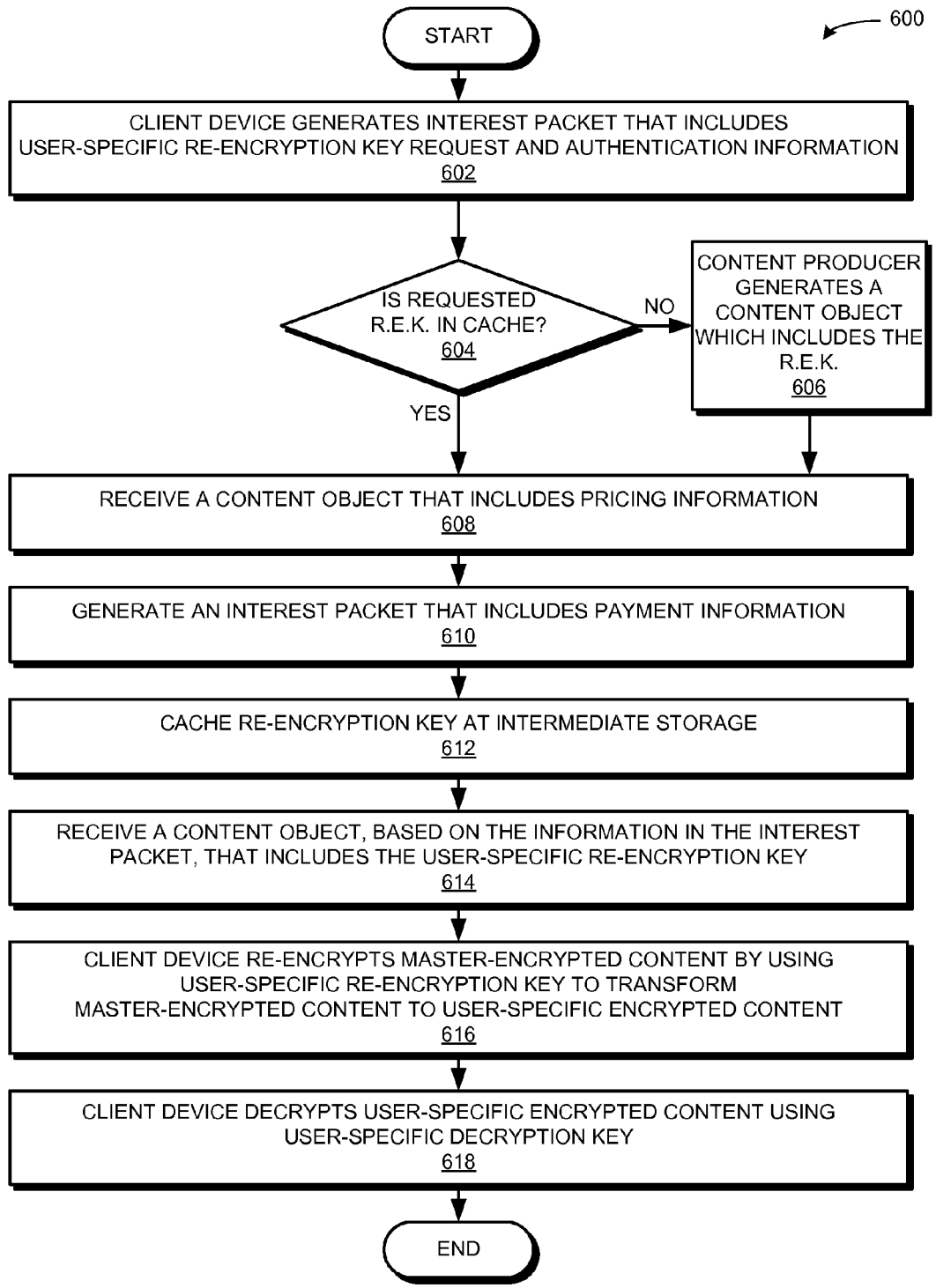
FIG. 6 presents a flow chart illustrating a method for processing encrypted content, including the flow of content relating to authentication, pricing, and payment, in accordance with an embodiment of the present invention.

FIG. 6 presents a flow chart illustrating a method 600 for processing encrypted content, including the flow of content relating to authentication, pricing, and payment, in accordance with an embodiment of the present invention. Assuming that the client device has already obtained the master-encrypted content, as described above and depicted in FIGS. 3, 4A, 4B, and 4C, the client device can generate a first interest packet that includes, in addition to a request for a user-specific re-encryption key, user authentication information (operation 602). The system then determines whether the requested user-specific re-encryption key already resides in the cache of an intermediate storage device (operation 604). If the requested user-specific re-encryption key does not reside in the cache of an intermediate storage, then the request is sent on to a content producer. The content producer generates a content object which includes the user-specific re-encryption key (operation 606).

If the requested user-specific re-encryption key does reside in the cache of an intermediate storage, then the client device receives a content object that includes pricing information (operation 608). This content object is based upon the contents of the generated first interest packet, as shown in FIG. 5, and could be sent to the client device by a content producer. The pricing information could also be specific to the user, based on user_authentication_information 506 included in interest packet 500. In response to the content object that includes pricing information, the client device can generate a second interest packet that includes payment information (operation 610).

At this point, similar to FIGS. 3 and 4B, the system caches the user-specific re-encryption key at the intermediate storage (operation 612). The client device then receives a content object which, based on the information in the first interest packet, includes the user-specific re-encryption key (operation 614). The client device performs re-encryption by first re-encrypting the master-encrypted content, using the user-specific re-encryption key, transforming the master-encrypted content to user-specific encrypted content (operation 616), and then decrypting the user-specific encrypted content by using a user-specific decryption key (operation 618).

Symmetric Key Encryption

Figure 7:
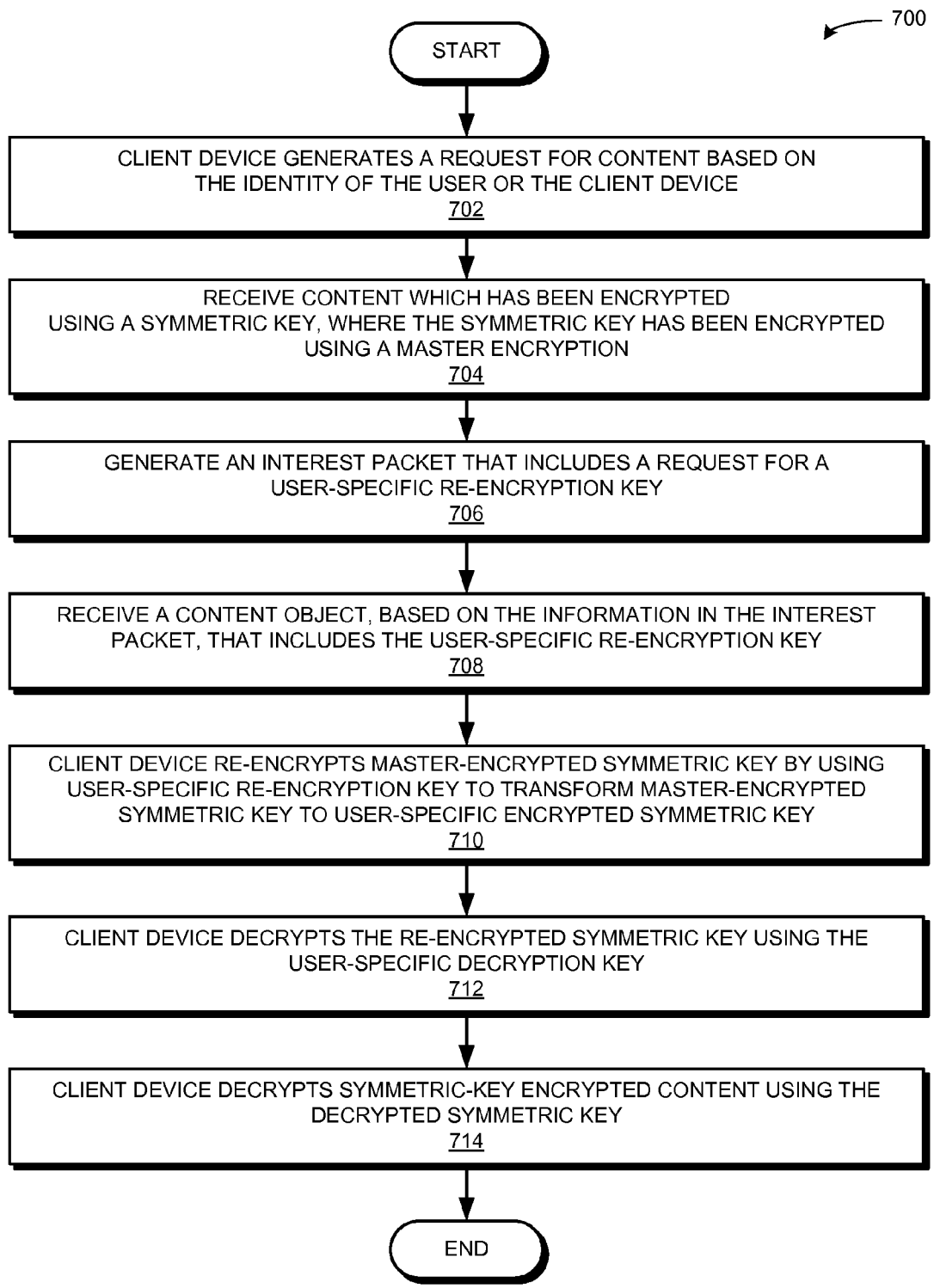
FIG. 7 presents a flow chart illustrating a method for processing encrypted content, where the content is encrypted using a symmetric key, in accordance with an embodiment of the present invention.

FIG. 7 presents a flow chart illustrating a method 700 for processing encrypted content, where the content is encrypted using a symmetric key, in accordance with an embodiment of the present invention. In this method, a hybrid encryption is used, whereby the content is encrypted using a symmetric key and the symmetric key is encrypted under a master encryption. A client device can generate a request for content based on the identity of the user or the client device (operation 702). The client device can then receive content which has been encrypted using a symmetric key, where the symmetric key has been encrypted using a master encryption (operation 704). A content producer, for example, may have encrypted the content using a symmetric key, and further encrypted the symmetric key using a master encryption key known only to the content producer. The client device can then generate an interest packet that includes a request for a user-specific re-encryption key (operation 706). The client device can receive a content object that, based on the information in the interest packet, includes the user-specific re-encryption key (operation 708).

In order to decrypt the symmetric-key encrypted content, the client device performs the following steps: 1) re-encrypts the master-encrypted symmetric key by using the user-specific re-encryption key to transform the master-encrypted symmetric key to a user-specific encrypted symmetric key (operation 710); 2) decrypts the re-encrypted symmetric key using the user-specific decryption key (operation 712); and 3) decrypts the symmetric key-encrypted content using the decrypted symmetric key (operation 714).

Apparatus and Computer System

Figure 8:
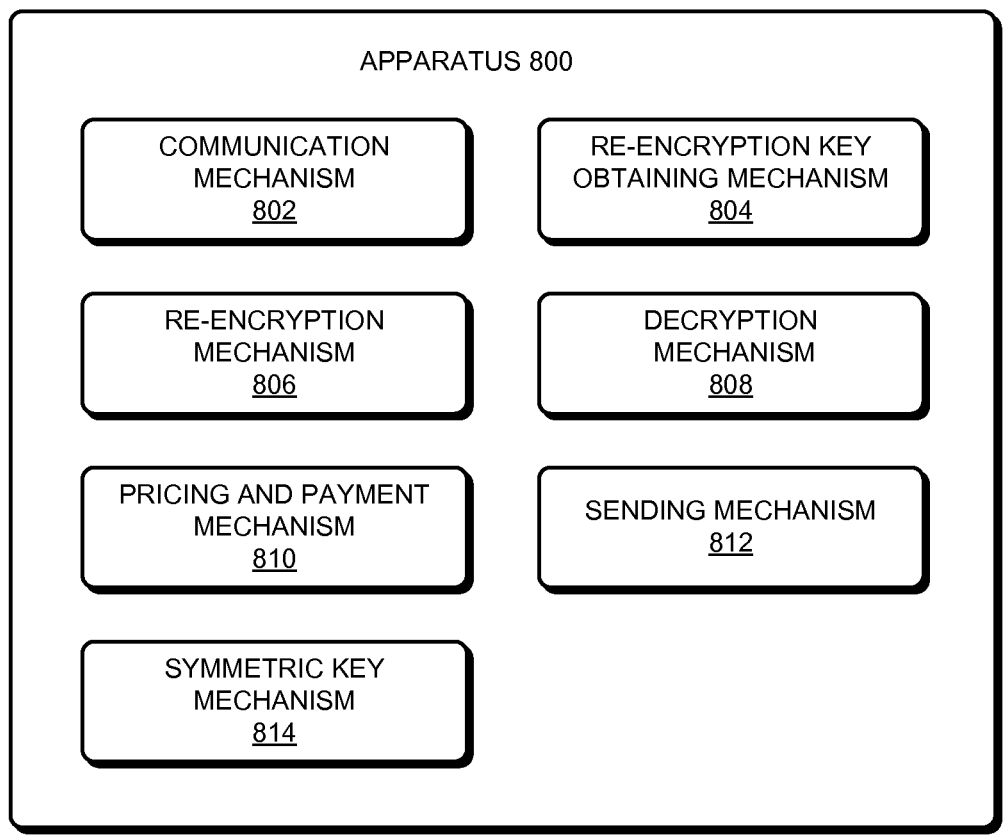
FIG. 8 illustrates an exemplary apparatus that facilitates processing encrypted content using re-encryption, in accordance with an embodiment of the present invention.

FIG. 8 illustrates an exemplary apparatus 800 that facilitates processing encrypted content using re-encryption, in accordance with an embodiment of the present invention. Apparatus 800 can comprise a plurality of modules which may communicate with one another via a wired or wireless communication channel. Apparatus 800 may be realized using one or more integrated circuits, and may include fewer or more modules than those shown in FIG. 8. Further, apparatus 800 may be integrated into a computer system, or realized as a separate device which is capable of communication with other computer systems and/or devices. Specifically, apparatus 800 can comprise a communication mechanism 802, a re-encryption key obtaining mechanism 804, a re-encryption mechanism 806, a decryption mechanism 808, a pricing and payment mechanism 810, a sending mechanism 812, and a symmetric key mechanism 814.

In some embodiments, communication mechanism 802 can send requests for content and receive responses containing master-encrypted content. Re-encryption key obtaining mechanism 804 can obtain a user-specific re-encryption key. This user-specific re-encryption key can be generated by a content producer and/or previously cached at intermediate storage. Re-encryption key-obtaining mechanism 804 can further generate an interest packet that includes a request for a user-specific re-encryption key, and also receive a content object, based on the information in the interest packet, that includes the user-specific re-encryption key. When the generated interest packet also includes user authentication information, pricing and payment mechanism 810 can receive a content object that includes information relating to pricing, based on information in the generated interest packet. Pricing and payment mechanism 810 can also generate a second interest packet that includes information relating to payment.

Re-encryption mechanism 806 can re-encrypt the master-encrypted content by using the user-specific re-encryption key to transform the master-encrypted content to a user-specific encrypted content, which can only be decrypted by a user-specific decryption key. Re-encryption mechanism 806 can be performed by either a client device or intermediate storage. Decryption mechanism 808 can decrypt the transformed user-specific encrypted content by using the user-specific decryption key.

Sending mechanism 812 can send, by an intermediate storage device, the transformed user-specific encrypted content to a client device, thus allowing the client device to utilize decryption mechanism 808 to decrypt the transformed user-specific encrypted content using the user-specific decryption key.

Symmetric key mechanism 814 can include content received from communication mechanism 802, where the received content is encrypted using a symmetric key, and where the symmetric key has been encrypted by, for example, a content producer, using a master encryption key. Symmetric key mechanism 814 obtains a user-specific re-encryption key from re-encryption key obtaining mechanism 804. Symmetric key mechanism 814 also includes a re-encryption mechanism that transforms the symmetric key-encrypted content by: re-encrypting the master-encrypted symmetric key using the user-specific re-encryption key to a user-specific encrypted symmetric key; decrypting the re-encrypted symmetric key using the user-specific decryption key; and decrypting the symmetric key-encrypted content using the decrypted symmetric key.

Figure 9:
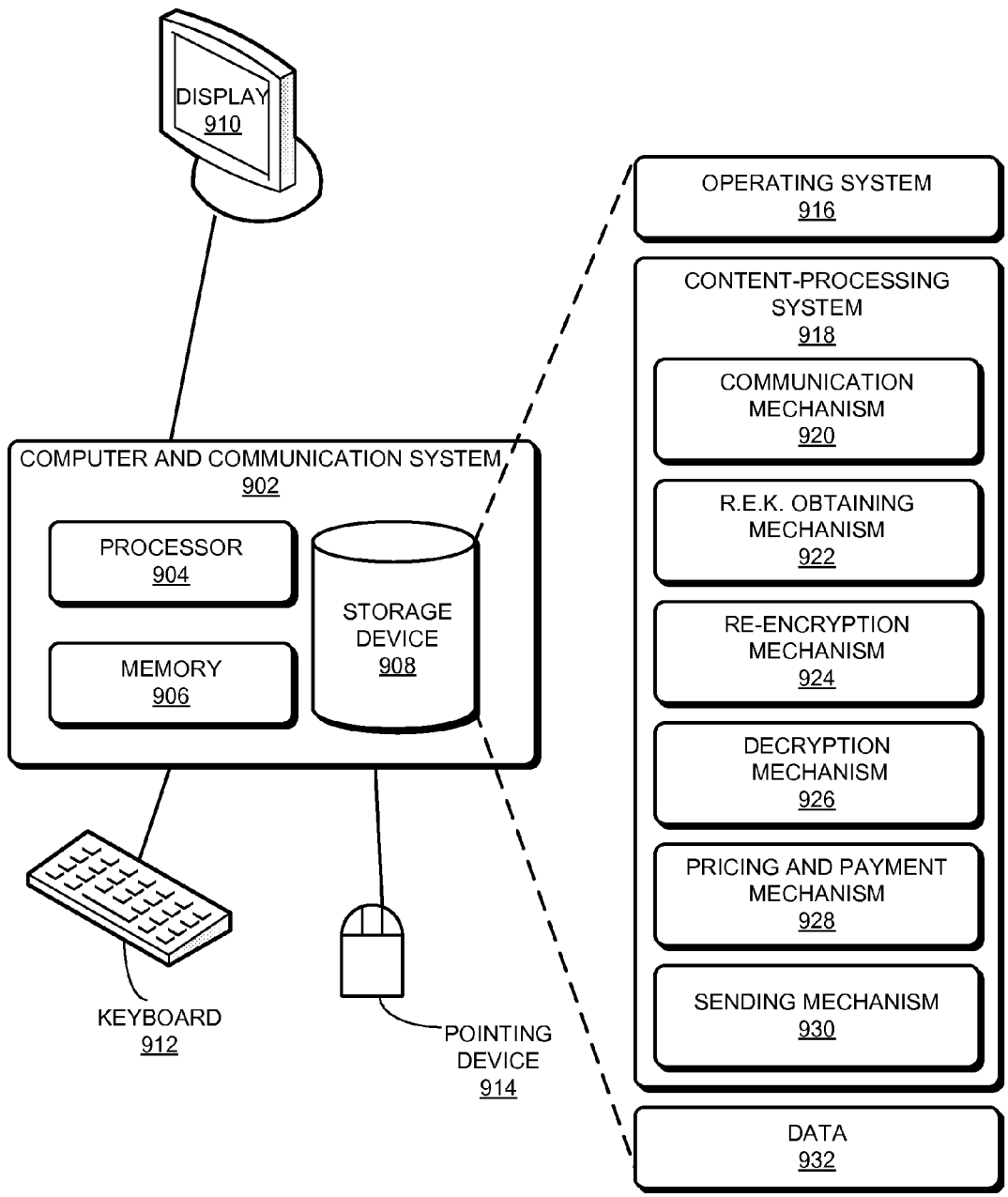
FIG. 9 illustrates an exemplary computer system that facilitates processing encrypted content using re-encryption, in accordance with an embodiment of the present invention.

FIG. 9 illustrates an exemplary computer and communication system 902 that facilitates processing encrypted content using re-encryption, in accordance with an embodiment of the present invention. Computer and communication system 902 includes a processor 904, a memory 906, and a storage device 908. Memory 906 can include a volatile memory (e.g., RAM) that serves as a managed memory, and can be used to store one or more memory pools. Furthermore, computer and communication system 902 can be coupled to a display device 910, a keyboard 912, and a pointing device 914. Storage device 908 can store an operating system 916, a content-processing system 918, and data 932.

Content-processing system 918 can include instructions, which when executed by computer and communication system 902, can cause computer and communication system 902 to perform methods and/or processes described in this disclosure. Specifically, content-processing system 918 may include instructions for sending requests for content and receiving responses containing master-encrypted content (communication mechanism 920). Further, content-processing system 918 can include instructions for obtaining a user-specific re-encryption key, that further includes generating an interest packet that includes a request for a user-specific re-encryption key, and also receiving a content object, based on the information in the interest packet, that includes the user-specific re-encryption key (re-encryption key obtaining mechanism 922). Content-processing system 918 can also include instructions for receiving a content object that includes information relating to pricing, based on information in the generated interest packet, as well as instructions for generating a second interest packet that includes information relating to payment (pricing and payment mechanism 928).

Content-processing system 918 can also include instructions for re-encrypting master-encrypted content by using the user-specific re-encryption key to transform the master-encrypted content to a user-specific encrypted content, which can only be decrypted by a user-specific decryption key (re-encryption mechanism 924). Content-processing system 918 can include instructions for sending the transformed user-specific encrypted content (sending mechanism 930). Content-processing system 918 can further include instructions for decrypting the transformed user-specific encrypted content by using the user-specific decryption key (decryption mechanism 926).

Data 932 can include any data that is required as input or that is generated as output by the methods and/or processes described in this disclosure. Specifically, data 932 can store at least master-encrypted content for one or more users, cryptographic keys (e.g., a user-specific public key, a user-specific decryption key, or a user-specific re-encryption key), and user-specific encrypted content for one or more users.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for processing encrypted content, the method comprising:
  in response to a first interest packet for content based on a name included in the first interest packet, wherein the name is a hierarchically structured variable length identifier which comprises contiguous name components ordered from a most general level to a most specific level, receiving, by a client computing device, master-encrypted content which has been encrypted by a content producing device based on a master encryption key known only to the content producing device, wherein the client computing device and the content producing device communicate over a content centric network;
  obtaining a user-specific re-encryption key that is generated for a user associated with the client computing device and is based on the name included in the first interest packet;
  re-encrypting the master-encrypted content by using the user-specific re-encryption key to directly transform the master-encrypted content to user-specific encrypted content, which can only be decrypted by a user-specific decryption key; and
  decrypting the transformed user-specific encrypted content by using the user-specific decryption key,
  wherein receiving the master-encrypted content involves transmitting, by the content producing device or a source other than the content producing device, the master encrypted content.

2. The method of claim 1, further comprising:
  determining the first interest packet for content based on the identity of the user or the client computing device;
  generating a second interest packet that includes a request for a user-specific re-encryption key; and
  receiving a first content object packet that is responsive to the second interest packet and indicates the user-specific re-encryption key.

3. The method of claim 2, wherein the second interest packet comprises one or more of:
   a public key of the user; or
   a name for the content corresponding to the requested user-specific re-encryption key.

4. The method of claim 2, wherein the second interest packet comprises authentication information relating to the user.

5. The method of claim 2, further comprising:
   receiving, by the client computing device, a second content object packet that includes information relating to pricing and is based on the information in the second interest packet; and
   generating a third interest packet that includes information relating to payment.

6. The method of claim 1, wherein re-encrypting the master-encrypted content is performed by an intermediate storage device associated with one or more of:
   an authorized distributor;
   an authorized retailer;
   a storage device selected specifically for a particular Internet Service Provider (ISP); or
   any medium capable of caching the master-encrypted content and the corresponding user-specific re-encryption key.

7. The method of claim 1, further comprising:
   sending, by an intermediate storage device, the transformed user-specific encrypted content to a client computing device, thereby allowing the client computing device to decrypt the transformed user-specific encrypted content using the user-specific decryption key.

8. The method of claim 1, wherein the received content is encrypted based on a symmetric key, and wherein the symmetric key is encrypted based on the master encryption key, and wherein re-encrypting the received master-encrypted content further comprises:
   re-encrypting the master-encrypted symmetric key, based on the user-specific re-encryption key, to a user-specific encrypted symmetric key;
   decrypting the re-encrypted symmetric key based on the user-specific decryption key; and
   decrypting the symmetric key-encrypted content based on the decrypted symmetric key.

9. A non-transitory computer-readable storage medium storing instructions that when executed by a computer cause the computer to perform a method, the method comprising:
   in response to a first interest packet for content based on a name included in the first interest packet, wherein the name is a hierarchically structured variable length identifier which comprises contiguous name components ordered from a most general level to a most specific level, receiving, by a client computing device, master-encrypted content which has been encrypted by a content producing device based on a master encryption key known only to the content producing device, wherein the client computing device and the content producing device communicate over a content centric network;
   obtaining a user-specific re-encryption key that is generated for a user associated with the client computing device and is based on the name included in the first interest packet;
   re-encrypting the master-encrypted content by using the user-specific re-encryption key to directly transform the master-encrypted content to user-specific encrypted content, which can only be decrypted by a user-specific decryption key; and
   decrypting the transformed user-specific encrypted content by using the user-specific decryption key,
   wherein receiving the master-encrypted content involves transmitting, by the content producing device or a source other than the content producing device, the master encrypted content.

10. The storage medium of claim 9, wherein the method further comprises:
    determining the first interest packet for content based on the identity of the user or the client computing device;
    generating a second interest packet that includes a request for a user-specific re-encryption key; and
    receiving a first content object packet that is responsive to the second interest packet and indicates the user-specific re-encryption key.

11. The storage medium of claim 10, wherein the second interest packet comprises one or more of:
    a public key of the user; or
    a name for the content corresponding to the requested user-specific re-encryption key.

12. The storage medium of claim 10, wherein the second interest packet comprises authentication information relating to the user.

13. The storage medium of claim 10, wherein the method further comprises:
    receiving, by the client computing device, a second content object packet that includes information relating to pricing and is based on the information in the second interest packet; and
    generating a third interest packet that includes information relating to payment.

14. The storage medium of claim 9, wherein re-encrypting the master-encrypted content is performed by an intermediate storage device associated with one or more of:
    an authorized distributor;
    an authorized retailer;
    a storage device selected specifically for a particular Internet Service Provider (ISP); or
    any medium capable of caching the master-encrypted content and the corresponding user-specific re-encryption key.

15. The storage medium of claim 9, wherein the method further comprises:
    sending, by an intermediate storage device, the transformed user-specific encrypted content to a client computing device, thereby allowing the client computing device to decrypt the transformed user-specific encrypted content using the user-specific decryption key.

16. The storage medium of claim 9, wherein the received content is encrypted based on a symmetric key, and wherein the symmetric key is encrypted based on the master encryption key,
    and wherein transforming the received master-encrypted content further comprises:
    re-encrypting the master-encrypted symmetric key, based on the user-specific re-encryption key, to a user-specific encrypted symmetric key;
    decrypting the re-encrypted symmetric key based on the user-specific decryption key; and
    decrypting the symmetric key-encrypted content based on the decrypted symmetric key.

17. A computer system for processing encrypted content, the system comprising:

a processor;

a storage device storing instructions that when executed by the processor cause the processor to perform a method, the method comprising:

in response to a first interest packet for content based on a name included in the first interest packet, wherein the name is a hierarchically structured variable length identifier which comprises contiguous name components ordered from a most general level to a most specific level, receiving, by a client computing device, master-encrypted content which has been encrypted by a content producing device based on a master encryption key known only to the content producing device, wherein the client computing device and the content producing device communicate over a content centric network;

obtaining a user-specific re-encryption key that is generated for a user associated with the client computing device and is based on the name included in the first interest packet;

re-encrypting the master-encrypted content by using the user-specific re-encryption key to directly transform the master-encrypted content to user-specific encrypted content, which can only be decrypted by a user-specific decryption key; and decrypting the transformed user-specific encrypted content by using the user-specific decryption key, wherein receiving the master-encrypted content involves transmitting, by the content producing device or a source other than the content producing device, the master encrypted content.

18. The computer system of claim 17, wherein the method further comprises:

determining the first interest packet for content based on the identity of the user or the client computing device;

generating a second interest packet that includes a request for a user-specific re-encryption key; and receiving a first content object packet that is responsive to the second interest packet and indicates the user-specific re-encryption key.

19. The computer system of claim 18, wherein the second interest packet comprises one or more of:

a public key of the user; or a name for the content corresponding to the requested user-specific re-encryption key.

20. The computer system of claim 18, wherein the second interest packet comprises authentication information relating to the user.

21. The computer system of claim 18, wherein the method further comprises:

receiving, by the client computing device, a second content object packet that includes information relating to pricing and is based on the information in the second interest packet; and generating a third interest packet that includes information relating to payment.

22. The computer system of claim 17, wherein re-encrypting of the master-encrypted content is performed by an intermediate storage device associated with one or more of:

an authorized distributor;

an authorized retailer;

a storage device selected specifically for a particular Internet Service Provider (ISP); or any medium capable of caching the master-encrypted content and the corresponding user-specific re-encryption key.

23. The computer system of claim 17, wherein the method further comprises:

sending, by an intermediate storage device, the transformed user-specific encrypted content to a client computing device, thereby allowing the client computing device to decrypt the transformed user-specific encrypted content using the user-specific decryption key.

24. The computer system of claim 17, wherein the received content is encrypted based on a symmetric key, and wherein the symmetric key is encrypted based on the master encryption key, and wherein re-encrypting the received master-encrypted content further comprises:

re-encrypting the master-encrypted symmetric key, based on the user-specific re-encryption key, to a user-specific encrypted symmetric key;

decrypting the re-encrypted symmetric key based on the user-specific decryption key; and decrypting the symmetric key-encrypted content based on the decrypted symmetric key.

* * * * *